(12) United States Patent
Gong et al.

(10) Patent No.: US 10,606,041 B2
(45) Date of Patent: Mar. 31, 2020

(54) OPTICAL IMAGING LENS AND ELECTRONIC DEVICE COMPRISING THE SAME

(71) Applicant: Genius Electronic Optical (Xiamen) Co., Ltd., Xiamen, Fujian (CN)

(72) Inventors: Jinhui Gong, Fujian (CN); Bin Wei Zhang, Fujian (CN); Wei Yu Lin, Fujian (CN)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 237 days.

(21) Appl. No.: 15/904,432

(22) Filed: Feb. 26, 2018

(65) Prior Publication Data

US 2018/0239110 A1    Aug. 23, 2018

Related U.S. Application Data

(63) Continuation of application No. 15/162,626, filed on May 24, 2016, now Pat. No. 9,939,618.

(30) Foreign Application Priority Data

Mar. 25, 2016    (CN) .......................... 2016 1 0179030

(51) Int. Cl.
*G02B 9/60*    (2006.01)
*G02B 13/00*   (2006.01)
*G02B 7/02*    (2006.01)
*G02B 9/54*    (2006.01)
*H04N 5/225*   (2006.01)

(52) U.S. Cl.
CPC ........... *G02B 13/006* (2013.01); *G02B 7/021* (2013.01); *G02B 9/54* (2013.01); *G02B 13/004* (2013.01); *H04N 5/2254* (2013.01); *H04N 5/2257* (2013.01)

(58) Field of Classification Search
CPC ........ G02B 13/006; G02B 7/021; G02B 9/54; G02B 13/004; G02B 1/041; G02B 13/0045; G02B 13/18
See application file for complete search history.

(56) References Cited

U.S. PATENT DOCUMENTS 9,348,117 B1 *   5/2016   Chang et al. ...... G02B 13/0045

* cited by examiner

*Primary Examiner* — Joseph P Martinez
(74) *Attorney, Agent, or Firm* — Winston Hsu

(57) ABSTRACT

An optical imaging lens set includes a first lens element with an object-side surface of a convex part in a vicinity of the optical axis, a second lens element with an image-side surface of a concave part in a vicinity of its periphery, the first lens element being glued to the second lens element to eliminate an air gap, a third lens element with an object-side surface of a concave part in a vicinity of its periphery, a fourth lens element and a fifth lens element of plastic material, ALT being the total thickness of the five lens elements and $G_{max}$ being the max value of the air gap from the first lens element to the fifth lens element so that $ALT/G_{max} \leq 2.2$.

20 Claims, 38 Drawing Sheets

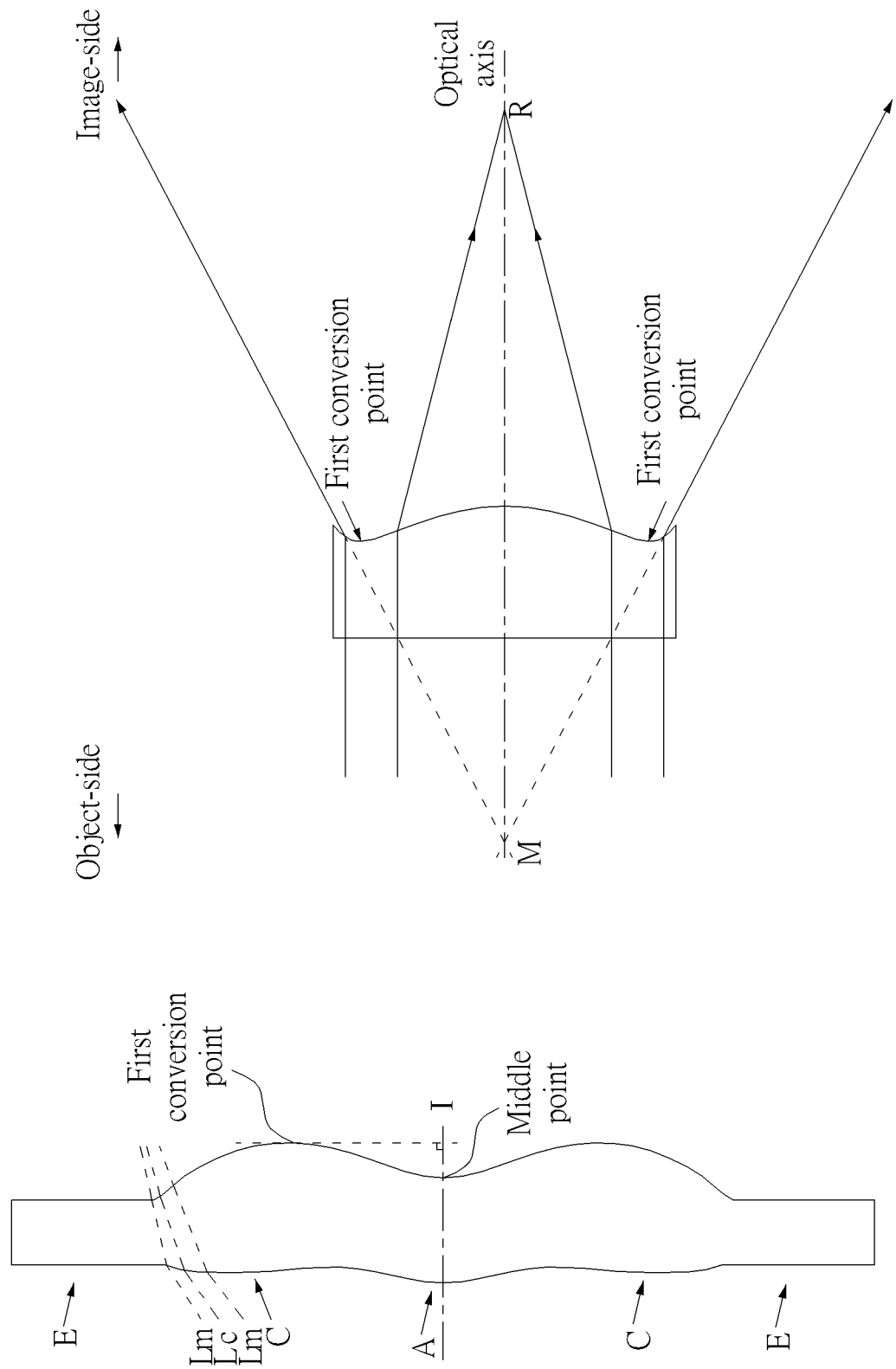

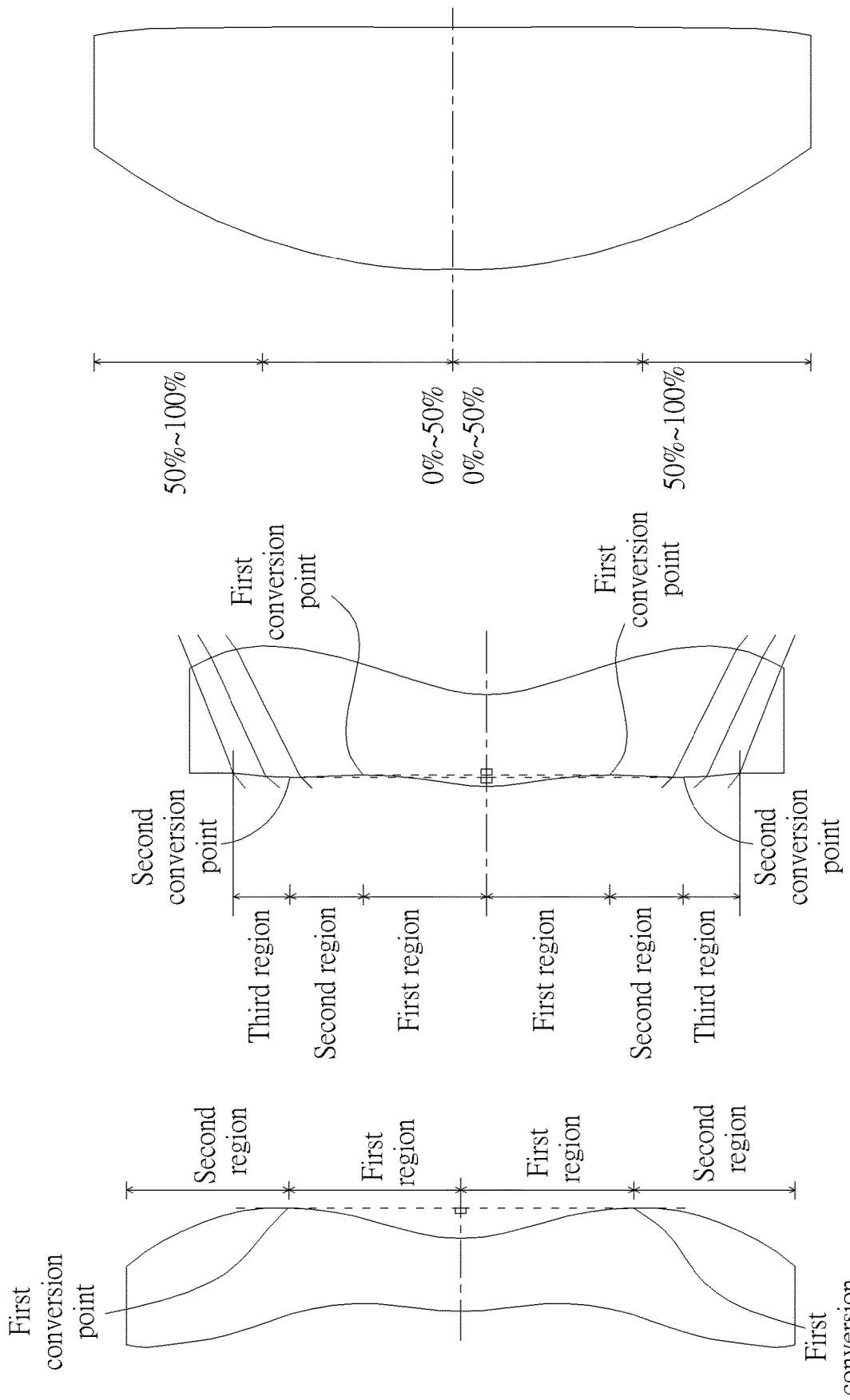

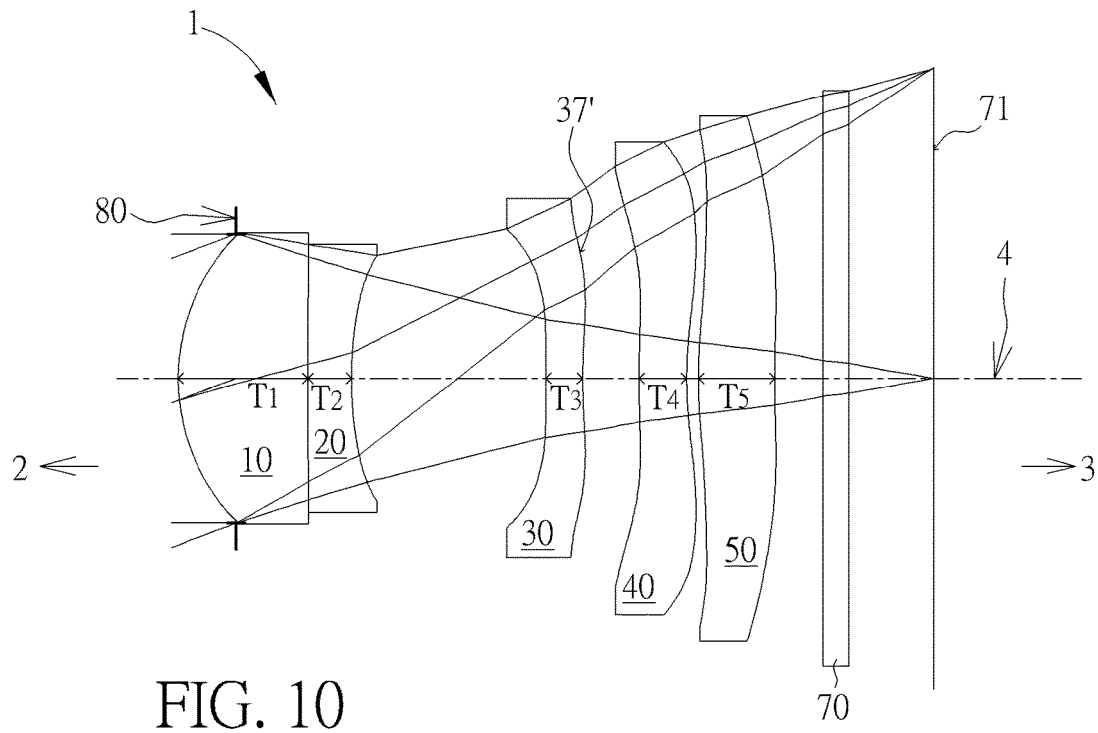
FIG. 10
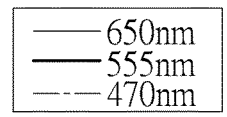
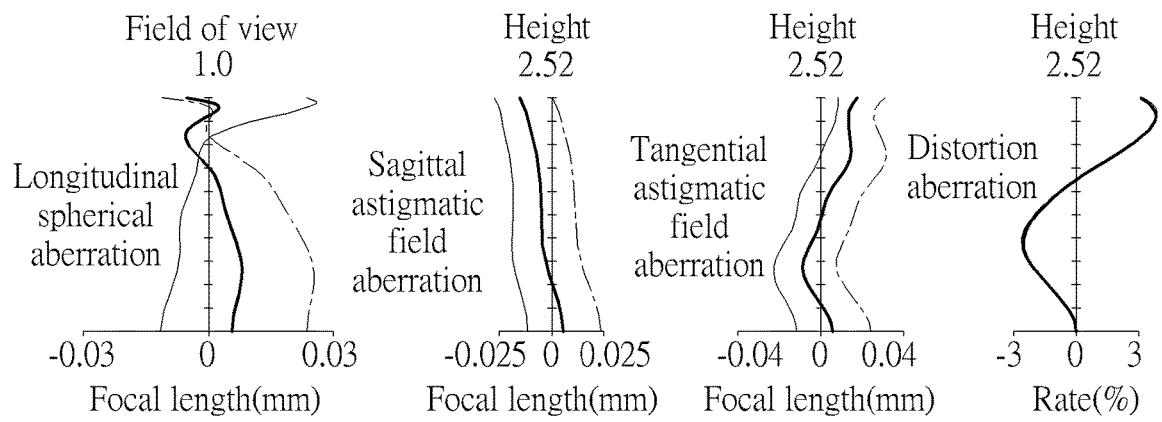
FIG. 11A   FIG. 11B   FIG. 11C   FIG. 11D

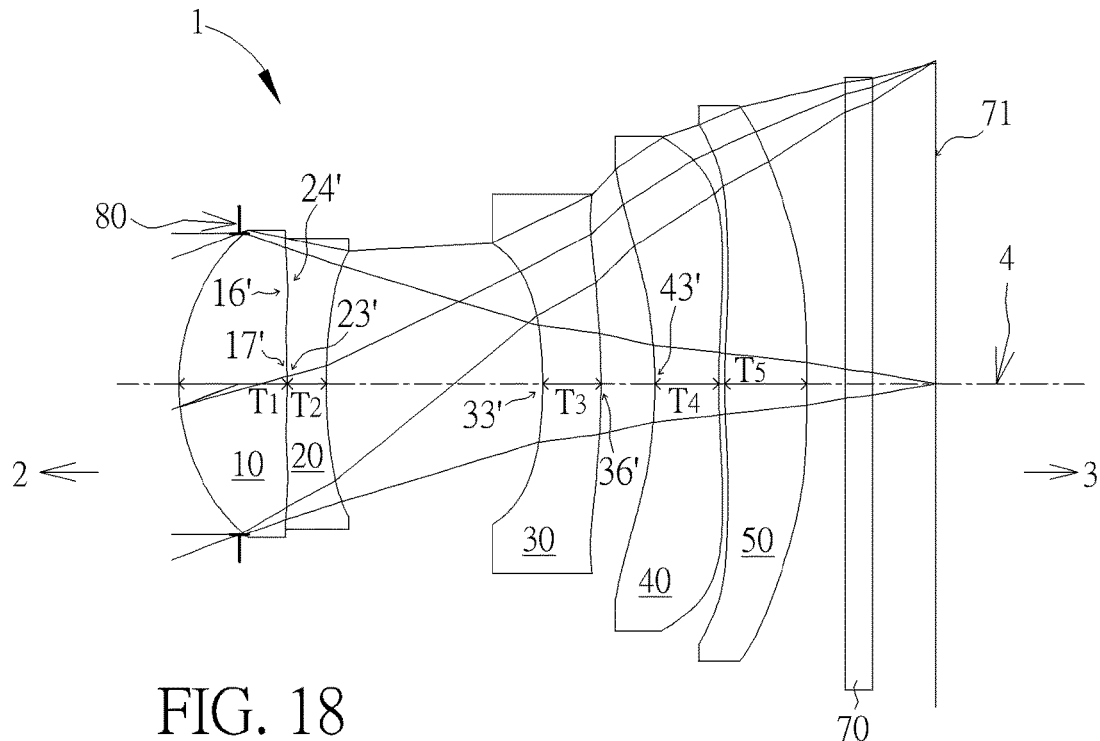
FIG. 18
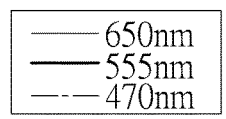
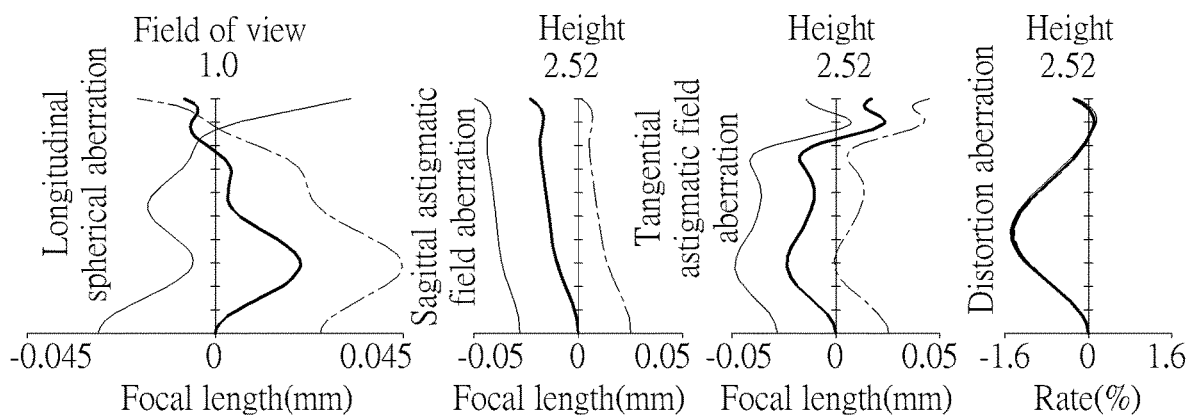
FIG. 19A   FIG. 19B  FIG. 19C  FIG. 19D

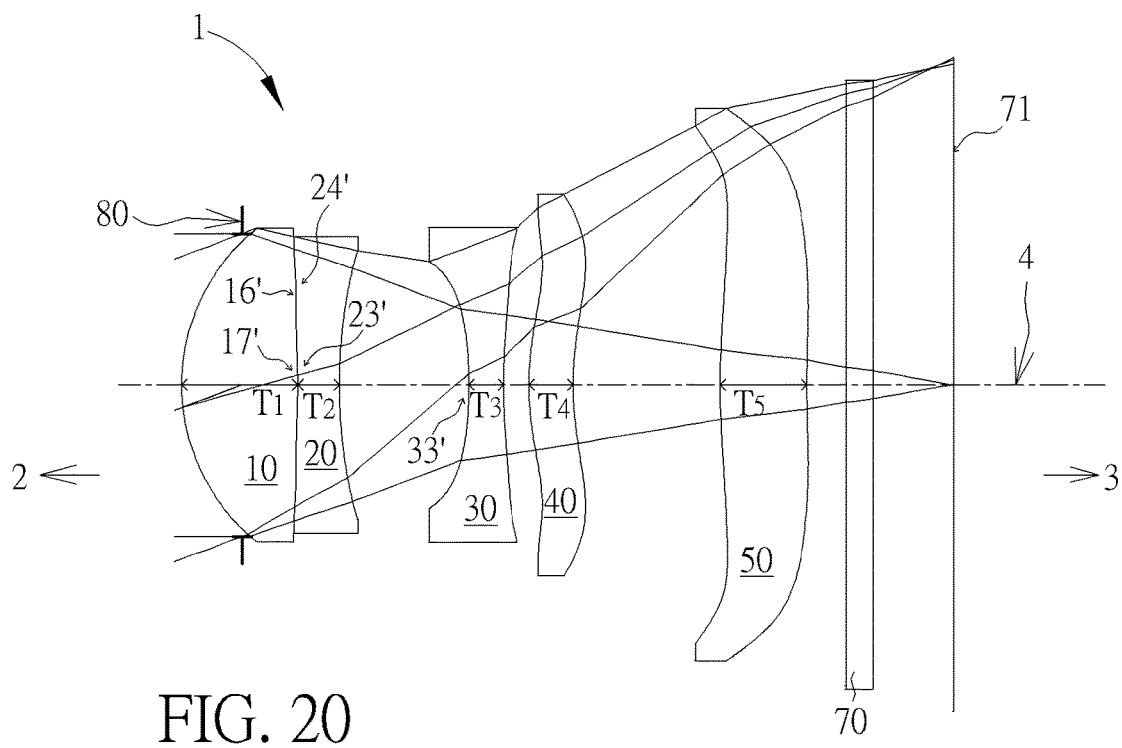
FIG. 20
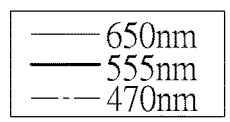
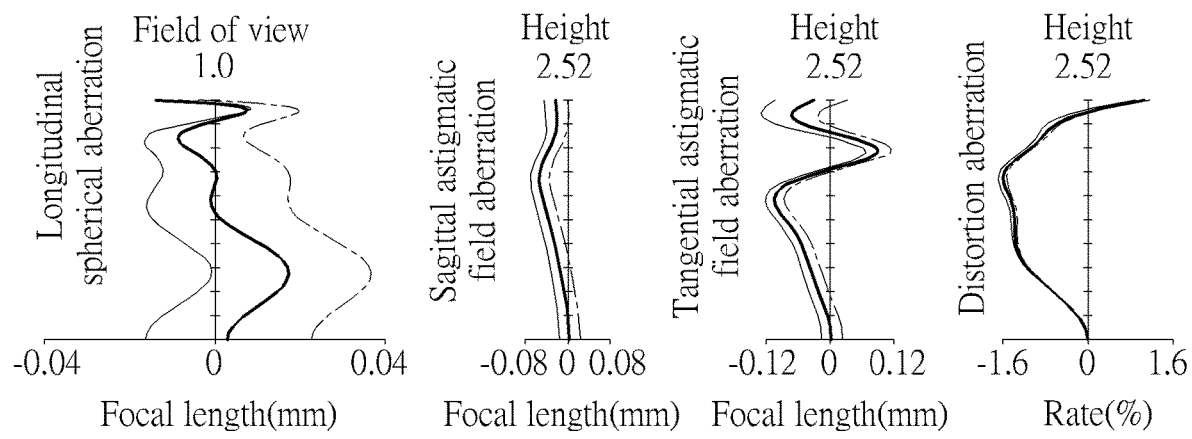
FIG. 21A   FIG. 21B  FIG. 21C  FIG. 21D

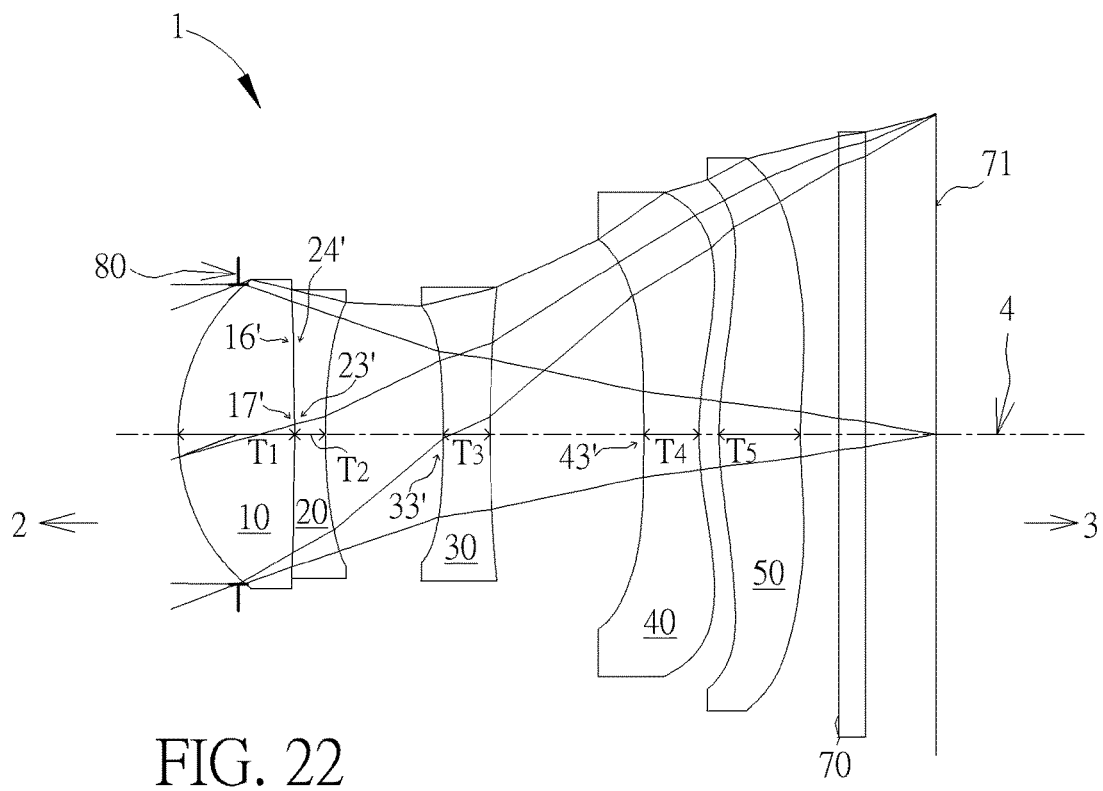
FIG. 22
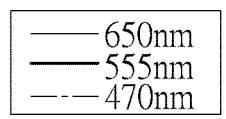
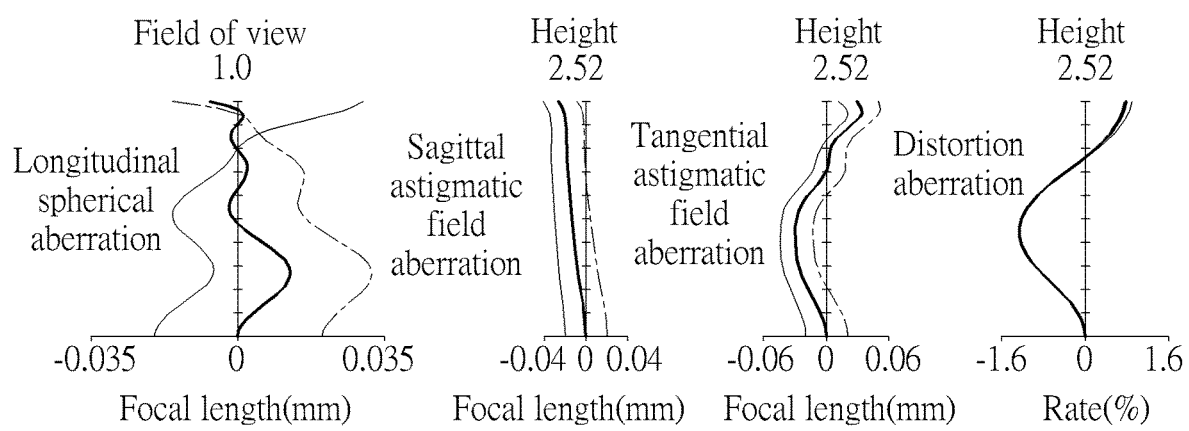
FIG. 23A  FIG. 23B  FIG. 23C  FIG. 23D

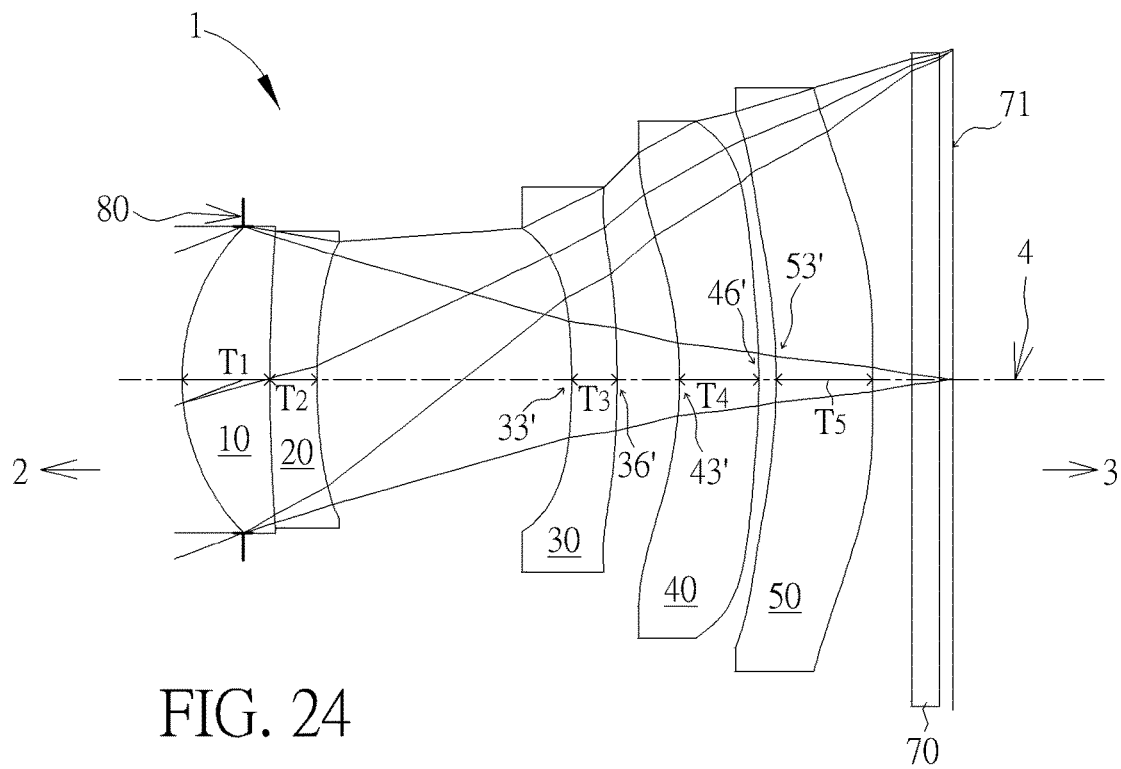
FIG. 24
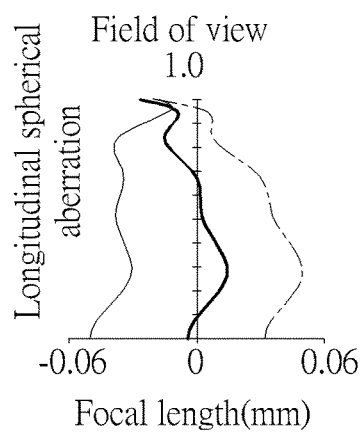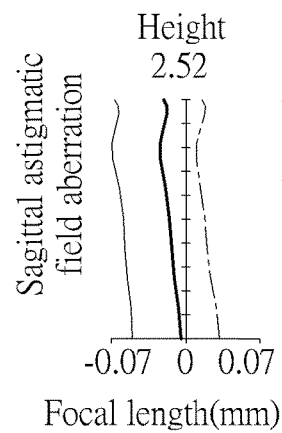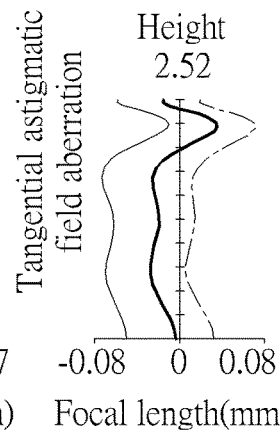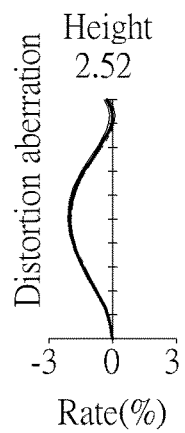
FIG. 25A   FIG. 25B   FIG. 25C   FIG. 25D

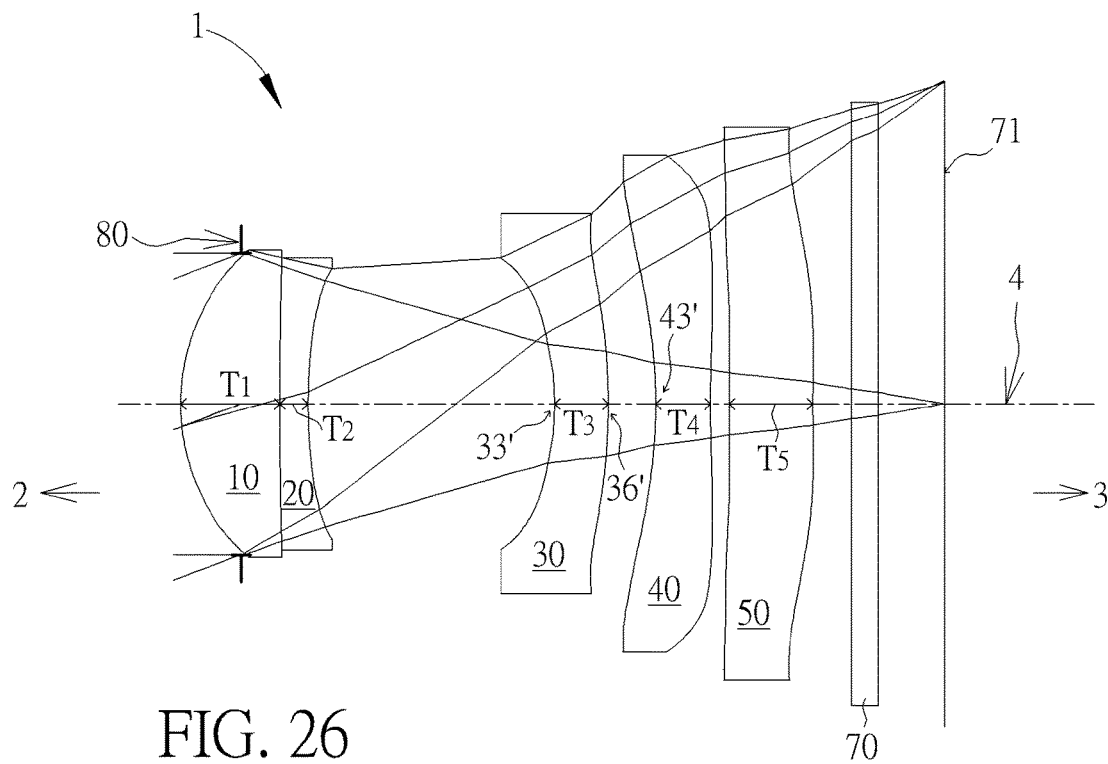
FIG. 26
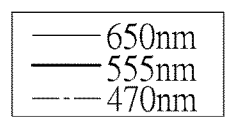
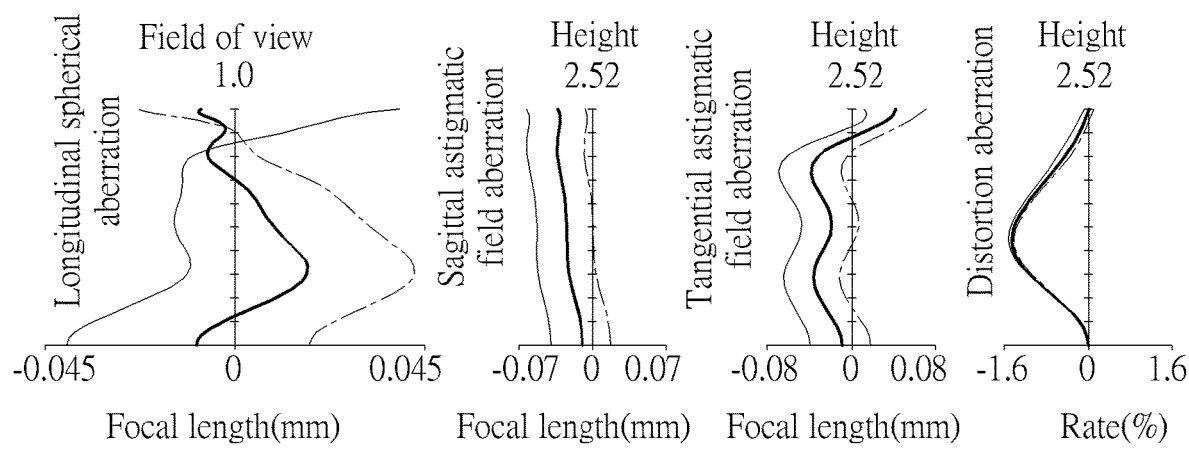
FIG. 27A   FIG. 27B   FIG. 27C   FIG. 27D

| First Example | | | | | | | |
|---|---|---|---|---|---|---|---|
| EFL=6.561 mm, HFOV=21.114 deg., Fno=2.80, TTL =6.142 mm, Image Height= 2.52 mm | | | | | | | |
| No. | surface | Curvature Radius | Ape. Stop Distance Lens Thickness Air Gap | Material | Refractive Index | Abbe No. | Focal Length |
| | Object | spheric | 1E+18 | 1E+04 | | | | |
| 80 | Ape. Stop | spheric | 1E+18 | -0.477 | | | | |
| 11 | First Lens | aspheric | 1.643 | 1.012 | $T_1$ | plastic | 1.535 | 55.690 | 3.062 |
| 21 | Second Lens | spheric | 228.681 | 0.260 | $T_2$ | plastic | 1.640 | 23.529 | -5.403 |
| 22 | | aspheric | 3.472 | 1.197 | $G_{23}$ | | | |
| 31 | Third Lens | aspheric | 6.851 | 0.328 | $T_3$ | plastic | 1.535 | 55.690 | -11.297 |
| 32 | | aspheric | 3.162 | 0.732 | $G_{34}$ | | | |
| 41 | Fourth Lens | aspheric | 5.872 | 0.546 | $T_4$ | plastic | 1.545 | 55.987 | -13.215 |
| 42 | | aspheric | 3.132 | 0.168 | $G_{45}$ | | | |
| 51 | Fifth Lens | aspheric | 5.810 | 0.488 | $T_5$ | plastic | 1.640 | 23.529 | 20.322 |
| 52 | | aspheric | 10.099 | 0.300 | $G_{56}$ | | | |
| 70 | IR Filter | spheric | 1E+18 | 0.210 | | | |
| | IR Filter-Image Plane | spheric | 1E+18 | 0.902 | | | |
| 71 | Image Plane | spheric | 1E+18 | 0.000 | | | |

FIG. 30

| No. | 11 | 22 | 31 | 32 |
|---|---|---|---|---|
| K | 0.000000E+00 | 0.000000E+00 | 0.000000E+00 | 0.000000E+00 |
| A4 | -1.230182E-03 | 2.424675E-02 | -1.268683E-01 | -1.297508E-01 |
| A6 | 1.235791E-03 | -2.021010E-02 | -5.327076E-02 | -2.044340E-02 |
| A8 | 8.005172E-03 | 1.957333E-01 | 1.493884E-01 | 1.196547E-01 |
| A10 | -1.515664E-02 | -5.042316E-01 | -1.626457E-01 | -1.398393E-01 |
| A12 | 1.453120E-02 | 7.238984E-01 | 3.979436E-02 | 7.828247E-02 |
| A14 | -6.657352E-03 | -5.273906E-01 | 3.487591E-02 | -1.906474E-02 |
| A16 | 1.310879E-03 | 1.599082E-01 | -1.559803E-02 | 1.725123E-03 |
| No. | 41 | 42 | 51 | 52 |
| K | 0.000000E+00 | 0.000000E+00 | 0.000000E+00 | 0.000000E+00 |
| A4 | -2.752111E-02 | -1.957525E-02 | -1.385354E-01 | -1.577631E-01 |
| A6 | -1.079555E-01 | -1.073663E-01 | 5.969586E-02 | 8.792966E-02 |
| A8 | 9.770253E-02 | 9.674504E-02 | -1.006196E-02 | -3.671167E-02 |
| A10 | -5.007599E-02 | -4.744155E-02 | -2.054490E-03 | 1.213781E-02 |
| A12 | 1.412031E-02 | 1.302650E-02 | 1.036961E-03 | -2.813153E-03 |
| A14 | -1.543835E-03 | -1.798706E-03 | -1.499978E-04 | 3.432618E-04 |
| A16 | -3.679688E-06 | 8.896675E-05 | 7.020712E-06 | -1.465228E-05 |

FIG. 31

| No. | | surface | Curvature Radius | Ape. Stop Distance Lens Thickness Air Gap | | Material | Refractive Index | Abbe No. | Focal Length |
|---|---|---|---|---|---|---|---|---|---|
| | \multicolumn{9}{|c|}{Second Example} | | | | | |
| | \multicolumn{9}{|c|}{EFL=8.051 mm, HFOV=17.025 deg., Fno=3.38, TTL =6.912 mm, Image Height= 2.52 mm} | | | | | |
| | Object | spheric | 1E+18 | 1E+04 | | | | | |
| 80 | Ape. Stop | spheric | 1E+18 | −0.477 | | | | | |
| 11 | First Lens | aspheric | 1.823 | 0.719 | $T_1$ | plastic | 1.535 | 55.690 | 3.399 |
| 21 | Second Lens | spheric | 228.681 | 0.483 | $T_2$ | plastic | 1.640 | 23.529 | −6.104 |
| 22 | | aspheric | 3.920 | 2.734 | $G_{23}$ | | | | |
| 31 | Third Lens | aspheric | −6.254 | 0.347 | $T_3$ | plastic | 1.535 | 55.690 | −7.500 |
| 32 | | aspheric | 11.510 | 0.072 | $G_{34}$ | | | | |
| 41 | Fourth Lens | aspheric | 4.055 | 0.202 | $T_4$ | plastic | 1.545 | 55.987 | −136.923 |
| 42 | | aspheric | 3.779 | 1.434 | $G_{45}$ | | | | |
| 51 | Fifth Lens | aspheric | −7.059 | 0.650 | $T_5$ | plastic | 1.640 | 23.529 | 18.940 |
| 52 | | aspheric | −4.634 | 0.020 | $G_{56}$ | | | | |
| 70 | IR Filter | spheric | 1E+18 | 0.210 | | | | | |
| | IR Filter-Image Plane | spheric | 1E+18 | 0.041 | | | | | |
| 71 | Image Plane | spheric | 1E+18 | 0.000 | | | | | |

FIG. 32

| No. | 11 | 22 | 31 | 32 |
|---|---|---|---|---|
| K | 0.000000E+00 | 0.000000E+00 | 0.000000E+00 | 0.000000E+00 |
| A4 | 6.740568E-04 | 2.204503E-02 | -1.338661E-01 | -1.476790E-01 |
| A6 | 1.443410E-03 | -2.621989E-02 | -4.347639E-02 | -4.102408E-02 |
| A8 | 7.504867E-03 | 2.058053E-01 | 1.289927E-01 | 1.229381E-01 |
| A10 | -1.342645E-02 | -5.158263E-01 | -1.409188E-01 | -1.265481E-01 |
| A12 | 1.369126E-02 | 7.013565E-01 | 5.335076E-02 | 7.412153E-02 |
| A14 | -6.750950E-03 | -4.801965E-01 | 5.727827E-03 | -2.192897E-02 |
| A16 | 1.370932E-03 | 1.313457E-01 | -6.176947E-03 | 2.463463E-03 |
| No. | 41 | 42 | 51 | 52 |
| K | 0.000000E+00 | 0.000000E+00 | 0.000000E+00 | 0.000000E+00 |
| A4 | -8.517524E-02 | -6.457133E-02 | -9.866001E-02 | -1.089565E-01 |
| A6 | -1.239090E-01 | -8.170330E-02 | 5.456254E-02 | 7.561185E-02 |
| A8 | 1.107506E-01 | 8.817855E-02 | -8.639874E-03 | -3.622168E-02 |
| A10 | -4.909110E-02 | -4.751367E-02 | -2.290498E-03 | 1.251254E-02 |
| A12 | 1.256299E-02 | 1.324270E-02 | 1.002806E-03 | -2.772750E-03 |
| A14 | -1.675275E-03 | -1.755461E-03 | -1.131238E-04 | 3.441878E-04 |
| A16 | 6.790646E-05 | 8.504393E-05 | 3.087473E-06 | -1.788259E-05 |

FIG. 33

| | | | Third Example | | | | | |
|---|---|---|---|---|---|---|---|---|
| | EFL=6.592 mm, HFOV=20.786 deg., Fno=2.80, TTL =6.123 mm, Image Height= 2.52 mm |
| No. | | surface | Curvature Radius | Ape. Stop Distance Lens Thickness Air Gap | | Material | Refractive Index | Abbe No. | Focal Length |
| | Object | spheric | 1E+18 | 1E+04 | | | | | |
| 80 | Ape. Stop | spheric | 1E+18 | -0.477 | | | | | |
| 11 | First Lens | aspheric | 1.670 | 1.056 | $T_1$ | plastic | 1.535 | 55.690 | 3.113 |
| 21 | Second Lens | spheric | 228.681 | 0.343 | $T_2$ | plastic | 1.640 | 23.529 | -5.497 |
| 22 | | aspheric | 3.532 | 1.579 | $G_{23}$ | | | | |
| 31 | Third Lens | aspheric | 180.591 | 0.299 | $T_3$ | plastic | 1.535 | 55.690 | -8.865 |
| 32 | | aspheric | 4.632 | 0.457 | $G_{34}$ | | | | |
| 41 | Fourth Lens | aspheric | 10.120 | 0.386 | $T_4$ | plastic | 1.545 | 55.987 | -9.812 |
| 42 | | aspheric | 3.457 | 0.095 | $G_{45}$ | | | | |
| 51 | Fifth Lens | aspheric | 3.950 | 0.619 | $T_5$ | plastic | 1.640 | 23.529 | 11.159 |
| 52 | | aspheric | 8.224 | 0.398 | $G_{56}$ | | | | |
| 70 | IR Filter | spheric | 1E+18 | 0.210 | | | | | |
| | IR Filter-Image Plane | spheric | 1E+18 | 0.683 | | | | | |
| 71 | Image Plane | | 1E+18 | 0.000 | | | | | |

FIG. 34

| No. | 11 | 22 | 31 | 32 |
|---|---|---|---|---|
| K | 0.000000E+00 | 0.000000E+00 | 0.000000E+00 | 0.000000E+00 |
| A4 | 7.466618E-04 | 3.445353E-02 | -1.422826E-01 | -1.483236E-01 |
| A6 | -1.803326E-03 | -2.709539E-02 | -6.630253E-02 | -3.368456E-02 |
| A8 | 8.715184E-03 | 2.015057E-01 | 1.440692E-01 | 1.282094E-01 |
| A10 | -1.369897E-02 | -5.035789E-01 | -1.416973E-01 | -1.263314E-01 |
| A12 | 1.351915E-02 | 7.340495E-01 | 6.006404E-02 | 7.355924E-02 |
| A14 | -6.907830E-03 | -5.459712E-01 | 3.550731E-03 | -2.194901E-02 |
| A16 | 1.482762E-03 | 1.683805E-01 | -7.213602E-03 | 2.503757E-03 |
| No. | 41 | 42 | 51 | 52 |
| K | 0.000000E+00 | 0.000000E+00 | 0.000000E+00 | 0.000000E+00 |
| A4 | -3.667137E-02 | -5.422379E-02 | -1.164797E-01 | -1.125564E-01 |
| A6 | -1.034369E-01 | -7.545580E-02 | 5.440483E-02 | 7.339628E-02 |
| A8 | 1.074503E-01 | 9.277395E-02 | -8.869115E-03 | -3.624388E-02 |
| A10 | -4.940373E-02 | -4.800082E-02 | -2.243910E-03 | 1.256551E-02 |
| A12 | 1.253824E-02 | 1.289615E-02 | 1.004207E-03 | -2.773846E-03 |
| A14 | -1.645972E-03 | -1.798354E-03 | -1.159886E-04 | 3.434526E-04 |
| A16 | 8.247961E-05 | 1.046060E-04 | 3.182929E-06 | -1.804552E-05 |

FIG. 35

| Fourth Example ||||||||
|---|---|---|---|---|---|---|---|
| | EFL=6.500 mm, HFOV=20.781 deg., Fno=2.77, TTL =6.120 mm, Image Height= 2.52 mm |
| No. | | surface | Curvature Radius | Ape. Stop Distance Lens Thickness Air Gap | Material | Refractive Index | Abbe No. | Focal Length |
| | Object | spheric | 1E+18 | 1E+04 | | | | |
| 80 | Ape. Stop | spheric | 1E+18 | -0.477 | | | | |
| 11 | First Lens | aspheric | 1.663 | 1.316 | $T_1$ | plastic | 1.535 | 55.690 | 3.129 |
| 21 | Second Lens | spheric | 228.681 | 0.260 | $T_2$ | plastic | 1.640 | 23.529 | -5.030 |
| 22 | | aspheric | 3.517 | 1.613 | $G_{23}$ | | | |
| 31 | Third Lens | aspheric | 17.128 | 0.249 | $T_3$ | plastic | 1.535 | 55.690 | -8.845 |
| 32 | | aspheric | 4.503 | 0.132 | $G_{34}$ | | | |
| 41 | Fourth Lens | aspheric | 15.419 | 0.321 | $T_4$ | plastic | 1.545 | 55.987 | -8.730 |
| 42 | | aspheric | 2.965 | 0.096 | $G_{45}$ | | | |
| 51 | Fifth Lens | aspheric | 4.151 | 0.723 | $T_5$ | plastic | 1.640 | 23.529 | 7.851 |
| 52 | | aspheric | 12.942 | 0.300 | $G_{56}$ | | | |
| 70 | IR Filter | | 1E+18 | 0.210 | | | | |
| | IR Filter-Image Plane | | 1E+18 | 0.900 | | | | |
| 71 | Image Plane | | 1E+18 | 0.000 | | | | |

FIG. 36

| No. | 11 | 22 | 31 | 32 |
|---|---|---|---|---|
| K | 0.000000E+00 | 0.000000E+00 | 0.000000E+00 | 0.000000E+00 |
| A2 | -2.884221E-03 | 1.247564E-02 | 9.593435E-03 | 3.407336E-02 |
| A4 | -2.539155E-03 | 3.904980E-02 | -1.429200E-01 | -1.463173E-01 |
| A6 | 1.221054E-03 | -1.888183E-02 | -6.211686E-02 | -3.710058E-02 |
| A8 | 4.823985E-03 | 1.948665E-01 | 1.394901E-01 | 1.246373E-01 |
| A10 | -1.313799E-02 | -4.932385E-01 | -1.380127E-01 | -1.255491E-01 |
| A12 | 1.405026E-02 | 7.182795E-01 | 5.319360E-02 | 7.410891E-02 |
| A14 | -6.919915E-03 | -5.259464E-01 | 3.859426E-03 | -2.183621E-02 |
| A16 | 1.330347E-03 | 1.616463E-01 | -4.691213E-03 | 2.445701E-03 |
| No. | 41 | 42 | 51 | 52 |
| K | 0.000000E+00 | 0.000000E+00 | 0.000000E+00 | 0.000000E+00 |
| A2 | 2.417126E-02 | -5.076274E-03 | 6.030018E-03 | -8.831133E-03 |
| A4 | -2.970241E-02 | -6.469688E-02 | -1.111997E-01 | -9.676860E-02 |
| A6 | -1.003658E-01 | -7.241951E-02 | 5.564121E-02 | 7.299138E-02 |
| A8 | 1.080563E-01 | 9.234338E-02 | -8.794932E-03 | -3.615780E-02 |
| A10 | -4.934875E-02 | -4.810631E-02 | -2.234919E-03 | 1.256624E-02 |
| A12 | 1.246407E-02 | 1.291927E-02 | 1.002919E-03 | -2.778090E-03 |
| A14 | -1.671329E-03 | -1.803316E-03 | -1.150830E-04 | 3.441301E-04 |
| A16 | 8.634665E-05 | 1.046618E-04 | 2.290284E-06 | -1.830389E-05 |

FIG. 37

| Fifth Example ||||||||
|---|---|---|---|---|---|---|---|
| EFL=6.562 mm, HFOV=20.716 deg., Fno=2.77, TTL =5.938 mm, Image Height= 2.52 mm ||||||||
| No. | surface | Curvature Radius | Ape. Stop Distance Lens Thickness Air Gap | Material | Refractive Index | Abbe No. | Focal Length |
| | Object | spheric | 1E+18 | 1E+04 | | | | |
| 80 | Ape. Stop | spheric | 1E+18 | -0.477 | | | | |
| 11 | First Lens | aspheric | 1.537 | 0.904 | $T_1$ | plastic | 1.535 | 55.690 | 2.859 |
| 21 | Second Lens | spheric | -21.206 | 0.341 | $T_2$ | plastic | 1.640 | 23.529 | -6.397 |
| 22 | | aspheric | 4.292 | 1.000 | $G_{23}$ | | | |
| 31 | Third Lens | aspheric | -3.630 | 0.271 | $T_3$ | plastic | 1.535 | 55.690 | -3.922 |
| 32 | | aspheric | 5.139 | 0.193 | $G_{34}$ | | | |
| 41 | Fourth Lens | aspheric | 2.137 | 0.325 | $T_4$ | plastic | 1.545 | 55.987 | 24.200 |
| 42 | | aspheric | 2.412 | 1.133 | $G_{45}$ | | | |
| 51 | Fifth Lens | aspheric | 6.489 | 0.652 | $T_5$ | plastic | 1.640 | 23.529 | 30.913 |
| 52 | | aspheric | 9.243 | 0.300 | $G_{56}$ | | | |
| 70 | IR Filter | spheric | 1E+18 | 0.210 | | | | |
| | IR Filter-Image Plane | spheric | 1E+18 | 0.607 | | | | |
| 71 | Image Plane | spheric | 1E+18 | 0.000 | | | | |

FIG. 38

| No. | 11 | 22 | 31 | 32 |
|---|---|---|---|---|
| K | 0.000000E+00 | 0.000000E+00 | 0.000000E+00 | 0.000000E+00 |
| A4 | -8.536028E-03 | 8.622643E-03 | -6.007427E-02 | -4.278421E-02 |
| A6 | 1.381050E-02 | -1.202323E-02 | -2.151136E-01 | -9.645021E-02 |
| A8 | -1.606066E-02 | 1.458402E-01 | 2.946452E-01 | 1.614270E-01 |
| A10 | 1.767651E-03 | -4.338557E-01 | -3.239080E-01 | -1.111984E-01 |
| A12 | 1.225565E-02 | 6.219704E-01 | 8.621512E-02 | 6.705106E-02 |
| A14 | -1.021509E-02 | -4.354746E-01 | 1.752192E-01 | -2.721539E-02 |
| A16 | 2.582754E-03 | 1.208643E-01 | -1.786739E-01 | 3.625533E-03 |
| No. | 41 | 42 | 51 | 52 |
| K | 0.000000E+00 | 0.000000E+00 | 0.000000E+00 | 0.000000E+00 |
| A4 | -1.043570E-01 | -9.153053E-02 | -8.263305E-02 | -1.239632E-01 |
| A6 | -1.144499E-01 | -7.238947E-02 | 4.912825E-02 | 8.506867E-02 |
| A8 | 1.007977E-01 | 6.895038E-02 | -1.094512E-02 | -4.084916E-02 |
| A10 | -4.752997E-02 | -4.046766E-02 | -2.320560E-03 | 1.288278E-02 |
| A12 | 1.672427E-02 | 1.520670E-02 | 1.106932E-03 | -2.734980E-03 |
| A14 | -3.127035E-05 | -3.102993E-03 | -1.223213E-04 | 3.237787E-04 |
| A16 | -1.180822E-03 | 3.026187E-04 | 4.091328E-06 | -1.508148E-05 |

FIG. 39

| Sixth Example | | | | | | | | |
|---|---|---|---|---|---|---|---|---|
| EFL= 6.550 mm, HFOV=20.681 deg., Fno=2.79, TTL =6.175 mm, Image Height= 2.52 mm | | | | | | | | |
| No. | | surface | Curvature Radius | Ape. Stop Distance Lens Thickness Air Gap | | Material | Refractive Index | Abbe No. | Focal Length |
| | Object | spheric | 1E+18 | 1E+04 | | | | | |
| 80 | Ape. Stop | spheric | 1E+18 | -0.477 | | | | | |
| 11 | First Lens | aspheric | 1.649 | 0.931 | $T_1$ | plastic | 1.535 | 55.690 | 3.074 |
| 21 | Second Lens | spheric | 228.681 | 0.260 | $T_2$ | plastic | 1.640 | 23.529 | -5.976 |
| 22 | | aspheric | 3.839 | 1.584 | $G_{23}$ | | | | |
| 31 | Third Lens | aspheric | 31.268 | 0.341 | $T_3$ | plastic | 1.535 | 55.690 | -10.287 |
| 32 | | aspheric | 4.674 | 0.696 | $G_{34}$ | | | | |
| 41 | Fourth Lens | aspheric | -75.932 | 0.562 | $T_4$ | plastic | 1.545 | 55.987 | -7.037 |
| 42 | | aspheric | 4.060 | 0.076 | $G_{45}$ | | | | |
| 51 | Fifth Lens | aspheric | 4.681 | 0.842 | $T_5$ | plastic | 1.640 | 23.529 | 12.497 |
| 52 | | aspheric | 10.387 | 0.300 | $G_{56}$ | | | | |
| 70 | IR Filter | spheric | 1E+18 | | | | | | |
| | IR Filter-Image Plane | spheric | 1E+18 | | | | | | |
| 71 | Image Plane | spheric | 1E+18 | | | | | | |

FIG. 40

| No. | 11 | 22 | 31 | 32 |
|---|---|---|---|---|
| K | 0.000000E+00 | 0.000000E+00 | 0.000000E+00 | 0.000000E+00 |
| A4 | 1.042504E-03 | 2.684246E-02 | -1.625287E-01 | -1.473272E-01 |
| A6 | -8.531850E-04 | -2.507404E-02 | -6.677528E-02 | -3.705407E-02 |
| A8 | 8.201001E-03 | 1.925021E-01 | 1.237257E-01 | 1.255600E-01 |
| A10 | -1.324194E-02 | -4.976758E-01 | -1.364842E-01 | -1.276275E-01 |
| A12 | 1.378254E-02 | 7.284040E-01 | 6.641566E-02 | 7.460219E-02 |
| A14 | -7.059241E-03 | -5.408135E-01 | 2.592380E-03 | -2.169911E-02 |
| A16 | 1.555783E-03 | 1.638285E-01 | -1.132436E-02 | 2.308382E-03 |
| No. | 41 | 42 | 51 | 52 |
| K | 0.000000E+00 | 0.000000E+00 | 0.000000E+00 | 0.000000E+00 |
| A4 | -1.073387E-02 | -5.708341E-02 | -1.021360E-01 | -9.491289E-02 |
| A6 | -1.053149E-01 | -6.848668E-02 | 5.495583E-02 | 7.315542E-02 |
| A8 | 1.076871E-01 | 9.236085E-02 | -9.227669E-03 | -3.667324E-02 |
| A10 | -4.950372E-02 | -4.791832E-02 | -2.269558E-03 | 1.253568E-02 |
| A12 | 1.256044E-02 | 1.290211E-02 | 1.007908E-03 | -2.773298E-03 |
| A14 | -1.661873E-03 | -1.799441E-03 | -1.147101E-04 | 3.445490E-04 |
| A16 | 8.648849E-05 | 1.038621E-04 | 3.219282E-06 | -1.784337E-05 |

FIG. 41

| Seventh Example ||||||||
|---|---|---|---|---|---|---|---|
| EFL=6.600 mm, HFOV=20.904 deg., Fno=2.81, TTL =5.890 mm, Image Height= 2.52 mm ||||||||
| No. | | surface | Curvature Radius | Ape. Stop Distance Lens Thickness Air Gap | Material | Refractive Index | Abbe No. | Focal Length |
| | Object | spheric | 1E+18 | 1E+04 | | | | |
| 80 | Ape. Stop | spheric | 1E+18 | 0.844 | | | | |
| 11 | First Lens | aspheric | 1.624 | 0.298 | $T_1$ | plastic | 1.535 | 55.690 | 3.024 |
| 21 | Second Lens | spheric | -88.407 | 1.687 | $T_2$ | plastic | 1.640 | 23.529 | -7.104 |
| 22 | | aspheric | 4.628 | 0.440 | $G_{23}$ | | | |
| 31 | Third Lens | aspheric | -3.773 | 0.431 | $T_3$ | plastic | 1.535 | 55.690 | -9.438 |
| 32 | | aspheric | -15.399 | 0.497 | $G_{34}$ | | | |
| 41 | Fourth Lens | aspheric | -3.592 | 0.046 | $T_4$ | plastic | 1.545 | 55.987 | -4.388 |
| 42 | | aspheric | 7.557 | 0.641 | $G_{45}$ | | | |
| 51 | Fifth Lens | aspheric | 5.453 | 0.300 | $T_5$ | plastic | 1.640 | 23.529 | 8.799 |
| 52 | | aspheric | 135.144 | 0.844 | $G_{56}$ | | | |
| 70 | IR Filter | spheric | 1E+18 | 0.210 | | | | |
| | IR Filter-Image Plane | spheric | 1E+18 | 0.495 | | | | |
| 71 | Image Plane | spheric | 1E+18 | 0.000 | | | | |

FIG. 42

| No. | 11 | 22 | 31 | 32 |
|---|---|---|---|---|
| K | 0.000000E+00 | 0.000000E+00 | 0.000000E+00 | 0.000000E+00 |
| A4 | -4.580567E-03 | 2.343946E-02 | -6.614130E-02 | -1.443624E-02 |
| A6 | 1.515099E-02 | -1.575119E-02 | -1.639517E-01 | -5.541700E-02 |
| A8 | -1.550720E-02 | 1.642832E-01 | 3.003952E-01 | 1.212530E-01 |
| A10 | 2.508679E-03 | -4.323193E-01 | -3.224259E-01 | -1.216006E-01 |
| A12 | 1.247004E-02 | 6.171174E-01 | 5.446056E-02 | 7.177139E-02 |
| A14 | -1.032171E-02 | -4.407832E-01 | 1.365059E-01 | -2.196712E-02 |
| A16 | 2.743155E-03 | 1.295508E-01 | -7.448099E-02 | 2.630144E-03 |
| No. | 41 | 42 | 51 | 52 |
| K | 0.000000E+00 | 0.000000E+00 | 0.000000E+00 | 0.000000E+00 |
| A4 | 3.417895E-02 | -9.885674E-03 | -1.146070E-01 | -1.313359E-01 |
| A6 | -8.561472E-02 | -7.948343E-02 | 5.739278E-02 | 8.783931E-02 |
| A8 | 9.508671E-02 | 8.743706E-02 | -9.587075E-03 | -4.042280E-02 |
| A10 | -4.986107E-02 | -4.638544E-02 | -2.614110E-03 | 1.299805E-02 |
| A12 | 1.349732E-02 | 1.299627E-02 | 1.031496E-03 | -2.714438E-03 |
| A14 | -1.663704E-03 | -1.940469E-03 | -9.393967E-05 | 3.219519E-04 |
| A16 | 5.213785E-05 | 1.233842E-04 | 6.091702E-07 | -1.638030E-05 |

FIG. 43

| Eighth Example ||||||||
|---|---|---|---|---|---|---|---|
| EFL=6.600 mm, HFOV=20.671 deg., Fno=2.80, TTL =5.980 mm, Image Height= 2.52 mm ||||||||
| No. | surface | Curvature Radius | Ape. Stop Distance Lens Thickness Air Gap | | Material | Refractive Index | Abbe No. | Focal Length |
| | Object | spheric | 1E+18 | 1E+04 | | | | |
| 80 | Ape. Stop | spheric | 1E+18 | 0.893 | | | | |
| 11 | First Lens | aspheric | 1.533 | 0.324 | $T_1$ | plastic | 1.535 | 55.690 | 2.853 |
| 21 | Second Lens | spheric | -34.224 | 1.001 | $T_2$ | plastic | 1.640 | 23.529 | -6.527 |
| 22 | | aspheric | 4.314 | 0.269 | $G_{23}$ | | | |
| 31 | Third Lens | aspheric | -3.559 | 0.200 | $T_3$ | plastic | 1.535 | 55.690 | -3.763 |
| 32 | | aspheric | 4.792 | 0.342 | $G_{34}$ | | | |
| 41 | Fourth Lens | aspheric | 2.133 | 1.139 | $T_4$ | plastic | 1.545 | 55.987 | 25.249 |
| 42 | | aspheric | 2.380 | 0.677 | $G_{45}$ | | | |
| 51 | Fifth Lens | aspheric | 5.508 | 0.300 | $T_5$ | plastic | 1.640 | 23.529 | 24.200 |
| 52 | | aspheric | 8.104 | 0.893 | $G_{56}$ | | | |
| 70 | IR Filter | spheric | 1E+18 | 0.210 | | | | |
| | IR Filter-Image Plane | spheric | 1E+18 | 0.624 | | | | |
| 71 | Image Plane | spheric | 1E+18 | 0.000 | | | | |

FIG. 44

| No. | 11 | 22 | 31 | 32 |
|---|---|---|---|---|
| K | 0.000000E+00 | 0.000000E+00 | 0.000000E+00 | 0.000000E+00 |
| A4 | -8.532789E-03 | 8.194475E-03 | -6.670392E-02 | -4.063334E-02 |
| A6 | 1.382186E-02 | -1.460528E-02 | -2.167839E-01 | -9.506553E-02 |
| A8 | -1.620086E-02 | 1.445928E-01 | 2.957864E-01 | 1.614606E-01 |
| A10 | 1.699739E-03 | -4.335192E-01 | -3.240252E-01 | -1.112024E-01 |
| A12 | 1.221114E-02 | 6.223960E-01 | 8.521633E-02 | 6.698308E-02 |
| A14 | -1.024051E-02 | -4.357452E-01 | 1.678286E-01 | -2.728175E-02 |
| A16 | 2.573868E-03 | 1.198212E-01 | -1.840532E-01 | 3.575750E-03 |
| No. | 41 | 42 | 51 | 52 |
| K | 0.000000E+00 | 0.000000E+00 | 0.000000E+00 | 0.000000E+00 |
| A4 | -1.017343E-01 | -9.305724E-02 | -8.226327E-02 | -1.231752E-01 |
| A6 | -1.146477E-01 | -7.239144E-02 | 4.928321E-02 | 8.501174E-02 |
| A8 | 1.006716E-01 | 6.891010E-02 | -1.094176E-02 | -4.085825E-02 |
| A10 | -4.754208E-02 | -4.051522E-02 | -2.323059E-03 | 1.288175E-02 |
| A12 | 1.672544E-02 | 1.518876E-02 | 1.105920E-03 | -2.735034E-03 |
| A14 | -3.027842E-05 | -3.126446E-03 | -1.226732E-04 | 3.237975E-04 |
| A16 | -1.180679E-03 | 3.014779E-04 | 4.015924E-06 | -1.506990E-05 |

FIG. 45

| No. | | surface | Curvature Radius | Ape. Stop Distance Lens Thickness Air Gap | | Material | Refractive Index | Abbe No. | Focal Length |
|---|---|---|---|---|---|---|---|---|---|
| | \multicolumn{9}{c|}{Ninth Example} | | | | | |
| | \multicolumn{9}{c|}{EFL= 6.599 mm, HFOV=20.704 deg., Fno=2.81, TTL =5.940 mm, Image Height= 2.52 mm} | | | | | |
| | Object | spheric | 1E+18 | 1E+04 | | | | | |
| 80 | Ape. Stop | spheric | 1E+18 | -0.477 | | | | | |
| 11 | First Lens | aspheric | 1.584 | 0.916 | $T_1$ | plastic | 1.535 | 55.690 | 2.948 |
| 21 | Second Lens | spheric | -26.472 | 0.230 | $T_2$ | plastic | 1.640 | 23.529 | -6.802 |
| 22 | | aspheric | 4.535 | 0.925 | $G_{23}$ | | | | |
| 31 | Third Lens | aspheric | -8.326 | 0.370 | $T_3$ | plastic | 1.535 | 55.690 | -9.254 |
| 32 | | aspheric | 12.496 | 1.207 | $G_{34}$ | | | | |
| 41 | Fourth Lens | aspheric | -21.763 | 0.431 | $T_4$ | plastic | 1.545 | 55.987 | -4.533 |
| 42 | | aspheric | 2.814 | 0.158 | $G_{45}$ | | | | |
| 51 | Fifth Lens | aspheric | 2.688 | 0.643 | $T_5$ | plastic | 1.640 | 23.529 | 8.877 |
| 52 | | aspheric | 4.593 | 0.300 | $G_{56}$ | | | | |
| 70 | IR Filter | spheric | 1E+18 | 0.210 | | | | | |
| | IR Filter-Image Plane | spheric | 1E+18 | 0.551 | | | | | |
| 71 | Image Plane | spheric | 1E+18 | 0.000 | | | | | |

FIG. 46

| No. | 11 | 22 | 31 | 32 |
|---|---|---|---|---|
| K | 0.000000E+00 | 0.000000E+00 | 0.000000E+00 | 0.000000E+00 |
| A4 | -3.618930E-03 | 1.934767E-02 | -3.523721E-02 | 6.856259E-03 |
| A6 | 1.162555E-02 | -2.500292E-02 | -1.284295E-01 | -4.397233E-02 |
| A8 | -1.143234E-02 | 1.746925E-01 | 2.338887E-01 | 9.753419E-02 |
| A10 | 1.079126E-03 | -4.401835E-01 | -2.597724E-01 | -1.080101E-01 |
| A12 | 1.123464E-02 | 6.098390E-01 | 5.648911E-02 | 7.232706E-02 |
| A14 | -9.378878E-03 | -4.297886E-01 | 9.487394E-02 | -3.021945E-02 |
| A16 | 2.580085E-03 | 1.245772E-01 | -6.539386E-02 | 6.090182E-03 |
| No. | 41 | 42 | 51 | 52 |
| K | 0.000000E+00 | 0.000000E+00 | 0.000000E+00 | 0.000000E+00 |
| A4 | -2.748197E-03 | -5.141569E-02 | -1.383820E-01 | -1.535728E-01 |
| A6 | -9.885583E-02 | -7.200120E-02 | 5.522732E-02 | 8.910642E-02 |
| A8 | 9.625537E-02 | 8.589189E-02 | -8.114177E-03 | -4.049252E-02 |
| A10 | -5.049271E-02 | -4.682900E-02 | -2.486424E-03 | 1.399272E-02 |
| A12 | 1.377958E-02 | 1.323575E-02 | 9.723897E-04 | -3.276660E-03 |
| A14 | -1.207612E-03 | -1.886273E-03 | -1.260778E-04 | 4.269989E-04 |
| A16 | -1.732077E-04 | 1.025345E-04 | 6.254924E-06 | -2.296640E-05 |

FIG. 47

| Tenth Example ||||||||
|---|---|---|---|---|---|---|---|
| EFL=6.597 mm, HFOV=20.873 deg., Fno=2.81, TTL =5.897 mm, Image Height= 2.52 mm ||||||||
| No. | surface | Curvature Radius | Ape. Stop Distance Lens Thickness Air Gap | | Material | Refractive Index | Abbe No. | Focal Length |
| | Object | spheric | 1E+18 | 1E+04 | | | | |
| 80 | Ape. Stop | spheric | 1E+18 | -0.477 | | | | |
| 11 | First Lens | aspheric | 1.704 | 0.677 | $T_1$ | plastic | 1.535 | 55.690 | 3.186 |
| 21 | Second Lens | spheric | 15.691 | 0.351 | $T_2$ | plastic | 1.640 | 23.529 | -8.069 |
| 22 | | aspheric | 4.875 | 1.951 | $G_{23}$ | | | | |
| 31 | Third Lens | aspheric | -5.455 | 0.346 | $T_3$ | plastic | 1.535 | 55.690 | -26.106 |
| 32 | | aspheric | -9.131 | 0.477 | $G_{34}$ | | | | |
| 41 | Fourth Lens | aspheric | -3.094 | 0.580 | $T_4$ | plastic | 1.545 | 55.987 | -6.248 |
| 42 | | aspheric | -35.310 | 0.148 | $G_{45}$ | | | | |
| 51 | Fifth Lens | aspheric | -12.398 | 0.753 | $T_5$ | plastic | 1.640 | 23.529 | -14.445 |
| 52 | | aspheric | 38.285 | 0.300 | $G_{56}$ | | | | |
| 70 | IR Filter | spheric | 1E+18 | 0.210 | | | | |
| | IR Filter-Image Plane | spheric | 1E+18 | 0.104 | | | | |
| 71 | Image Plane | spheric | 1E+18 | 0.000 | | | | |

FIG. 48

| No. | 11 | 22 | 31 | 32 |
|---|---|---|---|---|
| K | 0.000000E+00 | 0.000000E+00 | 0.000000E+00 | 0.000000E+00 |
| A4 | -6.853011E-03 | 1.362884E-02 | -4.908895E-02 | -1.069415E-02 |
| A6 | 1.952008E-02 | -2.399747E-03 | -1.751492E-01 | -5.893014E-02 |
| A8 | -1.762597E-02 | 1.528297E-01 | 3.142529E-01 | 1.188848E-01 |
| A10 | 2.527096E-03 | -4.457812E-01 | -3.027148E-01 | -1.203125E-01 |
| A12 | 1.287744E-02 | 6.251750E-01 | 4.115558E-02 | 7.316537E-02 |
| A14 | -1.030677E-02 | -4.221425E-01 | 1.096478E-01 | -2.267806E-02 |
| A16 | 2.677390E-03 | 1.134065E-01 | -5.106025E-02 | 2.690079E-03 |
| No. | 41 | 42 | 51 | 52 |
| K | 0.000000E+00 | 0.000000E+00 | 0.000000E+00 | 0.000000E+00 |
| A4 | 3.534085E-02 | 3.987283E-03 | -8.776995E-02 | -1.449110E-01 |
| A6 | -8.300826E-02 | -7.656328E-02 | 5.789454E-02 | 9.266155E-02 |
| A8 | 9.662345E-02 | 8.744110E-02 | -9.389044E-03 | -4.074858E-02 |
| A10 | -5.002794E-02 | -4.623116E-02 | -2.627632E-03 | 1.296048E-02 |
| A12 | 1.329548E-02 | 1.300389E-02 | 1.028288E-03 | -2.711403E-03 |
| A14 | -1.690508E-03 | -1.947182E-03 | -9.587937E-05 | 3.228597E-04 |
| A16 | 7.267689E-05 | 1.222339E-04 | 5.624547E-07 | -1.629400E-05 |

FIG. 49

| Eleventh Example ||||||||
|---|---|---|---|---|---|---|---|
| EFL=6.560 mm, HFOV=20.798 deg., Fno=2.81, TTL =5.940 mm, Image Height= 2.52 mm ||||||||
| No. | surface | Curvature Radius | Ape. Stop Distance Lens Thickness Air Gap | Material | Refractive Index | Abbe No. | Focal Length |
| | Object | spheric | 1E+18 | 1E+04 | | | | |
| 80 | Ape. Stop | spheric | 1E+18 | -0.477 | | | | |
| 11 | First Lens | aspheric | 1.660 | 0.775 | $T_1$ | plastic | 1.535 | 55.690 | 3.097 |
| 21 | Second Lens | spheric | 43.310 | 0.210 | $T_2$ | plastic | 1.640 | 23.529 | -7.347 |
| 22 | | aspheric | 4.635 | 1.900 | $G_{23}$ | | | | |
| 31 | Third Lens | aspheric | -3.523 | 0.437 | $T_3$ | plastic | 1.535 | 55.690 | -24.596 |
| 32 | | aspheric | -5.013 | 0.369 | $G_{34}$ | | | | |
| 41 | Fourth Lens | aspheric | -4.168 | 0.427 | $T_4$ | plastic | 1.545 | 55.987 | -5.762 |
| 42 | | aspheric | 13.322 | 0.143 | $G_{45}$ | | | | |
| 51 | Fifth Lens | aspheric | 13.032 | 0.656 | $T_5$ | plastic | 1.640 | 23.529 | 438.844 |
| 52 | | aspheric | 13.392 | 0.300 | $G_{56}$ | | | | |
| 70 | IR Filter | spheric | 1E+18 | 0.210 | | | | |
| | IR Filter- Image Plane | spheric | 1E+18 | 0.513 | | | | |
| 71 | Image Plane | spheric | 1E+18 | 0.000 | | | | |

FIG. 50

| No. | 11 | 22 | 31 | 32 |
|---|---|---|---|---|
| K | 0.000000E+00 | 0.000000E+00 | 0.000000E+00 | 0.000000E+00 |
| A4 | -3.107769E-03 | 2.360712E-02 | -4.001649E-02 | 8.594168E-03 |
| A6 | 1.707318E-02 | -1.537081E-02 | -1.716007E-01 | -5.828766E-02 |
| A8 | -1.586853E-02 | 1.604901E-01 | 3.190661E-01 | 1.197154E-01 |
| A10 | 3.338702E-03 | -4.323222E-01 | -3.177890E-01 | -1.212105E-01 |
| A12 | 1.249631E-02 | 6.204172E-01 | 4.115308E-02 | 7.204072E-02 |
| A14 | -1.074019E-02 | -4.392289E-01 | 1.289767E-01 | -2.197707E-02 |
| A16 | 3.067202E-03 | 1.262038E-01 | -6.210844E-02 | 2.603913E-03 |
| No. | 41 | 42 | 51 | 52 |
| K | 0.000000E+00 | 0.000000E+00 | 0.000000E+00 | 0.000000E+00 |
| A4 | 3.666682E-02 | 8.197790E-06 | -9.895408E-02 | -1.296680E-01 |
| A6 | -8.428533E-02 | -7.695802E-02 | 5.906997E-02 | 8.800376E-02 |
| A8 | 9.518217E-02 | 8.754046E-02 | -9.323336E-03 | -4.038775E-02 |
| A10 | -5.014458E-02 | -4.642973E-02 | -2.599883E-03 | 1.301640E-02 |
| A12 | 1.337021E-02 | 1.297589E-02 | 1.020580E-03 | -2.707014E-03 |
| A14 | -1.668239E-03 | -1.944824E-03 | -9.697369E-05 | 3.232581E-04 |
| A16 | 6.884198E-05 | 1.250160E-04 | 1.063260E-06 | -1.670502E-05 |

FIG. 51

| Example | First | Second | Third | Fourth | Fifth | Sixth | Seventh | Eighth | Ninth | Tenth | Eleventh |
|---|---|---|---|---|---|---|---|---|---|---|---|
| $T_1$ | 1.012 | 0.719 | 1.056 | 1.316 | 0.904 | 0.931 | 0.844 | 0.893 | 0.916 | 0.677 | 0.775 |
| $G_{12}$ | 0.010 | 0.010 | 0.010 | 0.010 | 0.010 | 0.010 | 0.010 | 0.010 | 0.010 | 0.010 | 0.010 |
| $T_2$ | 0.260 | 0.483 | 0.343 | 0.260 | 0.341 | 0.260 | 0.298 | 0.324 | 0.230 | 0.351 | 0.210 |
| $G_{23}$ | 1.197 | 2.734 | 1.579 | 1.613 | 1.000 | 1.584 | 1.687 | 1.001 | 0.925 | 1.951 | 1.900 |
| $T_3$ | 0.328 | 0.347 | 0.299 | 0.249 | 0.271 | 0.341 | 0.440 | 0.269 | 0.370 | 0.346 | 0.437 |
| $G_{34}$ | 0.732 | 0.072 | 0.457 | 0.132 | 0.193 | 0.696 | 0.431 | 0.200 | 1.207 | 0.477 | 0.369 |
| $T_4$ | 0.546 | 0.202 | 0.386 | 0.321 | 0.325 | 0.562 | 0.497 | 0.342 | 0.431 | 0.580 | 0.427 |
| $G_{45}$ | 0.168 | 1.434 | 0.095 | 0.096 | 1.133 | 0.076 | 0.046 | 1.139 | 0.158 | 0.148 | 0.143 |
| $T_5$ | 0.488 | 0.650 | 0.619 | 0.723 | 0.652 | 0.842 | 0.641 | 0.677 | 0.643 | 0.753 | 0.656 |
| BFL | 1.412 | 0.271 | 1.291 | 1.410 | 1.117 | 0.884 | 1.005 | 1.134 | 1.061 | 0.614 | 1.023 |
| EFL | 6.561 | 8.051 | 6.592 | 6.500 | 6.562 | 6.550 | 6.600 | 6.600 | 6.599 | 6.597 | 6.560 |
| ALT | 2.633 | 2.401 | 2.702 | 2.869 | 2.494 | 2.936 | 2.721 | 2.506 | 2.589 | 2.707 | 2.505 |
| AAG | 2.097 | 4.240 | 2.130 | 1.841 | 2.327 | 2.355 | 2.164 | 2.340 | 2.290 | 2.575 | 2.412 |
| TTL | 6.142 | 6.912 | 6.123 | 6.120 | 5.938 | 6.175 | 5.890 | 5.980 | 5.940 | 5.897 | 5.940 |
| $G_{max}$ | 1.197 | 2.734 | 1.579 | 1.613 | 1.133 | 1.584 | 1.687 | 1.139 | 1.207 | 1.951 | 1.900 |
| ALT/$G_{max}$ | 2.200 | 0.878 | 1.712 | 1.778 | 2.200 | 1.854 | 1.613 | 2.200 | 2.145 | 1.388 | 1.318 |
| $(G_{23}+G_{45})/T_4$ | 2.500 | 20.633 | 4.335 | 5.320 | 6.561 | 2.953 | 3.484 | 6.261 | 2.513 | 3.617 | 4.785 |
| AAG/$G_{34}$ | 2.863 | 58.991 | 4.665 | 13.985 | 12.034 | 3.386 | 5.017 | 11.725 | 1.897 | 5.401 | 6.536 |
| $(G_{23}+G_{34})/T_2$ | 7.420 | 5.809 | 5.927 | 6.712 | 3.502 | 8.766 | 7.099 | 3.703 | 9.271 | 6.921 | 10.806 |
| ALT/$T_5$ | 5.400 | 3.694 | 4.368 | 3.970 | 3.824 | 3.488 | 4.244 | 3.700 | 4.029 | 3.594 | 3.818 |
| $T_1/G_{34}$ | 1.381 | 10.000 | 2.313 | 10.000 | 4.676 | 1.339 | 1.955 | 4.474 | 0.758 | 1.420 | 2.100 |
| $G_{23}/(T_2+T_5)$ | 1.601 | 2.413 | 1.641 | 1.642 | 1.008 | 1.438 | 1.795 | 1.000 | 1.060 | 1.767 | 2.194 |
| AAG/$(T_3+T_5)$ | 2.572 | 4.251 | 2.321 | 1.895 | 2.521 | 1.992 | 2.001 | 2.472 | 2.262 | 2.342 | 2.208 |
| ALT/$(T_3+T_4)$ | 3.014 | 4.370 | 3.947 | 5.033 | 4.181 | 3.252 | 2.901 | 4.099 | 3.233 | 2.922 | 2.900 |
| $(T_4+T_5)/G_{34}$ | 1.411 | 11.854 | 2.200 | 7.931 | 5.054 | 2.018 | 2.639 | 5.106 | 0.889 | 2.796 | 2.934 |
| EFL/$(G_{23}+G_{34})$ | 3.401 | 2.870 | 3.239 | 3.725 | 5.496 | 2.874 | 3.116 | 5.496 | 3.095 | 2.717 | 2.891 |
| $G_{23}/T_3$ | 3.650 | 7.869 | 5.285 | 6.488 | 3.690 | 4.646 | 3.829 | 3.717 | 2.500 | 5.633 | 4.351 |
| $(G_{34}+G_{45})/T_2$ | 3.462 | 3.119 | 1.605 | 0.874 | 3.892 | 2.967 | 1.601 | 4.128 | 5.936 | 1.780 | 2.440 |
| ALT/$T_1$ | 2.602 | 3.341 | 2.559 | 2.180 | 2.758 | 3.152 | 3.226 | 2.806 | 2.828 | 4.000 | 3.232 |
| EFL/$(T_1+T_2)$ | 5.159 | 6.700 | 4.711 | 4.124 | 5.270 | 5.498 | 5.780 | 5.423 | 5.761 | 6.419 | 6.659 |

FIG. 52

OPTICAL IMAGING LENS AND ELECTRONIC DEVICE COMPRISING THE SAME

CROSS REFERENCE TO RELATED APPLICATIONS

This application is a continuation of the application, Ser. No. 15/162,626, filed on May 24, 2016, which claims priority to Chinese Patent Application No. 201610179030.2, filed on Mar. 25, 2016. The contents thereof are included herein by reference.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of reduced length and an electronic device which includes such optical imaging lens set.

2. Description of the Prior Art

The specification of consumer electronics changes all the time to pursue smaller and smaller sizes. The current trend of research is to develop an optical imaging lens set of a shorter length with uncompromised good quality to meet the demand. The most important characters of an optical imaging lens set are image quality and size.

As far as an optical imaging lens set of five lens elements is concerned, the prior art proposes a longer distance from the object-side surface of the first lens element to the image plane, which does not favor the size reduction of mobile phones or of cameras. On the other hand, the image quality tends to deteriorate for capturing images of an object far away so it is still a problem to reduce the system length efficiently and to maintain sufficient optical performance in this field. This is an important objective to research.

SUMMARY OF THE INVENTION

In the light of the above, the present invention proposes an optical imaging lens set of lightweight, low production cost, reduced length, high resolution and high image quality. The optical imaging lens set of five lens elements of the present invention includes an aperture stop, a first lens element, a second lens element, a third lens element, a fourth lens element and a fifth lens element sequentially from an object side to an image side along an optical axis. Each lens element has an object-side surface facing toward the object side as well as an image-side surface facing toward the image side.

The first lens element has an object-side surface with a convex portion in a vicinity of the optical axis. The second lens element has an image-side surface with a concave portion in a vicinity of its periphery and is glued to the first lens element without an air gap. The third lens element has an object-side surface with a concave portion in a vicinity of its periphery. The fourth lens element and the fifth lens element are made of a plastic material. The optical imaging lens set exclusively has five lens elements with refractive power. ALT is the total thickness of the five lens elements and $G_{max}$ is the max value of the air gaps from the first lens element to the fifth lens element so that $ALT/G_{max} \leq 2.2$.

In the optical imaging lens set of five lens elements of the present invention, an air gap $G_{23}$ between the second lens element and the third lens element along the optical axis, an air gap $G_{45}$ between the fourth lens element and the fifth lens element along the optical axis and the fourth lens element has a fourth lens element thickness $T_4$ to satisfy $(G_{23}+G_{45})/T_4 \geq 2.5$.

In the optical imaging lens set of five lens elements of the present invention, an air gap $G_{34}$ between the third lens element and the fourth lens element and the sum of all air gaps AAG between each lens elements from the first lens element to the fifth lens element along the optical axis satisfy $AAG/G_{34} \leq 60.0$.

In the optical imaging lens set of five lens elements of the present invention, the second lens element has a second lens element thickness $T_2$ to satisfy $(G_{23}+G_{34})/T_2 \geq 3.5$.

In the optical imaging lens set of five lens elements of the present invention, the fifth lens element has a fifth lens element thickness $T_5$ to satisfy $ALT/T_5 < 5.4$.

In the optical imaging lens set of five lens elements of the present invention, the first lens element has a first lens element thickness $T_1$ to satisfy $T_1/G_{34} \leq 10.0$.

The optical imaging lens set of five lens elements of the present invention satisfies $G_{23}/(T_2+T_5) \geq 1.0$.

In the optical imaging lens set of five lens elements of the present invention, the third lens element has a third lens element thickness $T_3$ to satisfy $AAG/(T_3+T_5) \geq 1.8$.

The optical imaging lens set of five lens elements of the present invention satisfies $ALT/(T_3+T_4) \geq 2.9$.

The optical imaging lens set of five lens elements of the present invention satisfies $(T_4+T_5)/G_{34} \leq 30.0$.

In the optical imaging lens set of five lens elements of the present invention, EFL is the effective focal length of the optical imaging lens set satisfies $EFL/(G_{23}+G_{34}) \leq 5.5$.

The optical imaging lens set of five lens elements of the present invention satisfies $G_{23}/T_3 \geq 2.5$.

The optical imaging lens set of five lens elements of the present invention satisfies $(G_{34}+G_{45})/T_2 \geq 0.8$.

The optical imaging lens set of five lens elements of the present invention satisfies $ALT/T_1 \leq 4.0$.

The optical imaging lens set of five lens elements of the present invention satisfies $EFL/(T_1+T_2) \leq 6.7$.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel and an image sensor disposed at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its circular periphery of one lens element.

FIG. 10 illustrates a third example of the optical imaging lens set of five lens elements of the present invention.

FIG. 11A illustrates the longitudinal spherical aberration on the image plane of the third example.

FIG. 11B illustrates the astigmatic aberration on the sagittal direction of the third example.

FIG. 11C illustrates the astigmatic aberration on the tangential direction of the third example.

FIG. 11D illustrates the distortion aberration of the third example.

FIG. 18 illustrates a seventh example of the optical imaging lens set of five lens elements of the present invention.

FIG. 19A illustrates the longitudinal spherical aberration on the image plane of the seventh example.

FIG. 19B illustrates the astigmatic aberration on the sagittal direction of the seventh example.

FIG. 19C illustrates the astigmatic aberration on the tangential direction of the seventh example.

FIG. 19D illustrates the distortion aberration of the seventh example.

FIG. 20 illustrates an eighth example of the optical imaging lens set of five lens elements of the present invention.

FIG. 21A illustrates the longitudinal spherical aberration on the image plane of the eighth example.

FIG. 21B illustrates the astigmatic aberration on the sagittal direction of the eighth example.

FIG. 21C illustrates the astigmatic aberration on the tangential direction of the eighth example.

FIG. 21D illustrates the distortion aberration of the eighth example.

FIG. 22 illustrates a ninth example of the optical imaging lens set of five lens elements of the present invention.

FIG. 23A illustrates the longitudinal spherical aberration on the image plane of the ninth example.

FIG. 23B illustrates the astigmatic aberration on the sagittal direction of the ninth example.

FIG. 23C illustrates the astigmatic aberration on the tangential direction of the ninth example.

FIG. 23D illustrates the distortion aberration of the ninth example.

FIG. 24 illustrates a tenth example of the optical imaging lens set of five lens elements of the present invention.

FIG. 25A illustrates the longitudinal spherical aberration on the image plane of the tenth example.

FIG. 25B illustrates the astigmatic aberration on the sagittal direction of the tenth example.

FIG. 25C illustrates the astigmatic aberration on the tangential direction of the tenth example.

FIG. 25D illustrates the distortion aberration of the tenth example.

FIG. 26 illustrates an eleventh example of the optical imaging lens set of five lens elements of the present invention.

FIG. 27A illustrates the longitudinal spherical aberration on the image plane of the eleventh example.

FIG. 27B illustrates the astigmatic aberration on the sagittal direction of the eleventh example.

FIG. 27C illustrates the astigmatic aberration on the tangential direction of the eleventh example.

FIG. 27D illustrates the distortion aberration of the eleventh example.

FIG. 30 shows the optical data of the first example of the optical imaging lens set.

FIG. 31 shows the aspheric surface data of the first example.

FIG. 32 shows the optical data of the second example of the optical imaging lens set.

FIG. 33 shows the aspheric surface data of the second example.

FIG. 34 shows the optical data of the third example of the optical imaging lens set.

FIG. 35 shows the aspheric surface data of the third example.

FIG. 36 shows the optical data of the fourth example of the optical imaging lens set.

FIG. 37 shows the aspheric surface data of the fourth example.

FIG. 38 shows the optical data of the fifth example of the optical imaging lens set.

FIG. 39 shows the aspheric surface data of the fifth example.

FIG. 40 shows the optical data of the sixth example of the optical imaging lens set.

FIG. 41 shows the aspheric surface data of the sixth example.

FIG. 42 shows the optical data of the seventh example of the optical imaging lens set.

FIG. 43 shows the aspheric surface data of the seventh example.

FIG. 44 shows the optical data of the eighth example of the optical imaging lens set.

FIG. 45 shows the aspheric surface data of the eighth example.

FIG. 46 shows the optical data of the ninth example of the optical imaging lens set.

FIG. 47 shows the aspheric surface data of the ninth example.

FIG. 48 shows the optical data of the tenth example of the optical imaging lens set.

FIG. 49 shows the aspheric surface data of the tenth example.

FIG. 50 shows the optical data of the eleventh example of the optical imaging lens set.

FIG. 51 shows the aspheric surface data of the eleventh example.

FIG. 52 shows some important ratios in the examples.

DETAILED DESCRIPTION

Figure 6:
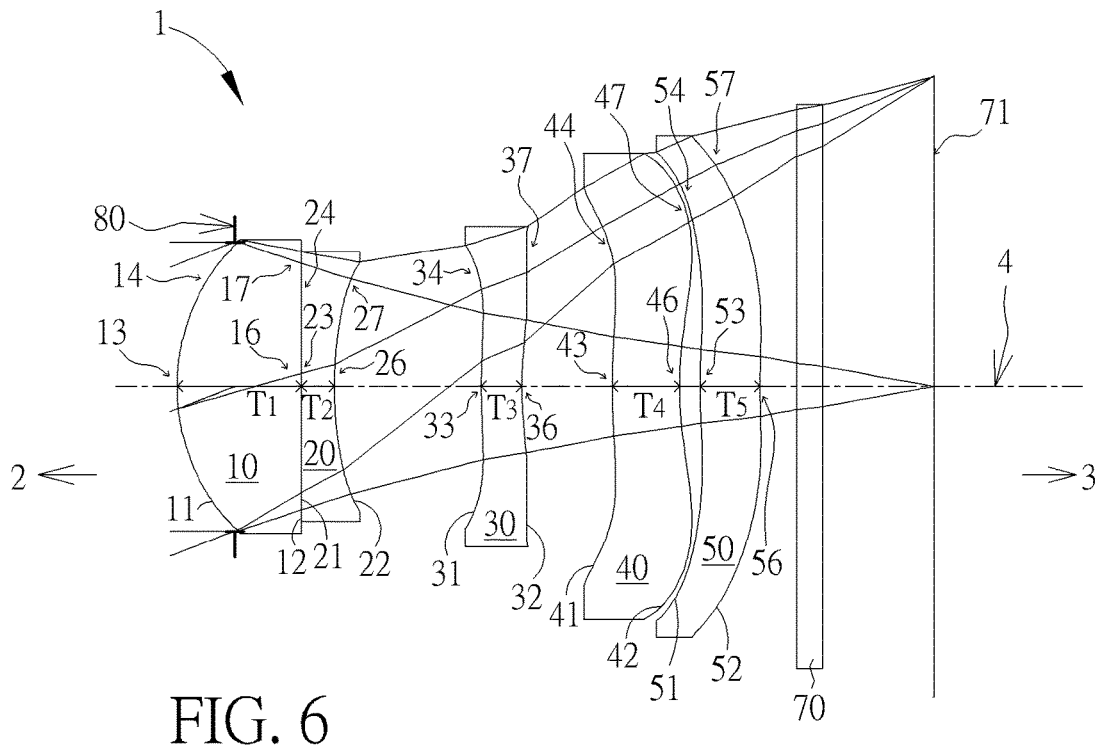
FIG. 6 illustrates a first example of the optical imaging lens set of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power calculated by Gaussian optical theory. An object-side/image-side surface refers to the region which allows imaging light passing through, in the drawing, imaging light includes Lc (chief ray) and Lm (marginal ray). As shown in FIG. 1, the optical axis is "I" and the lens element is symmetrical with respect to the optical axis I. The region A that near the optical axis and for light to pass through is the region in a vicinity of the optical axis, and the region C that the marginal ray passing through is the region in a vicinity of a certain lens element's circular periphery. In addition, the lens element may include an extension part E for the lens element to be installed in an optical imaging lens set (that is the region outside the region C perpendicular to the optical axis). Ideally speaking, no light would pass through the extension part, and the actual structure and shape of the extension part is not limited to this and may have other variations. For the reason of simplicity, the extension part is not illustrated in the following examples. More, precisely, the method for determining the surface shapes or the region in a vicinity of the optical axis, the region in a vicinity of its circular periphery and other regions is described in the following paragraphs:

1. FIG. 1 is a radial cross-sectional view of a lens element. Before determining boundaries of those aforesaid portions, two referential points should be defined first, middle point and conversion point. The middle point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the $N^{th}$ conversion point (farthest one to the optical axis within the scope of the clear aperture of the surface). The portion of a surface of the lens element between the middle point and the first conversion point is defined as the portion in a vicinity of the optical axis. The portion located radially outside of the $N^{th}$ conversion point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the conversion point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the middle point and the first conversion point has a convex shape, the portion located radially outside of the first conversion point has a concave shape, and the first conversion point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0-50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens set 1 of five lens elements of the present invention, sequentially from an object side 2 (where an object is located) to an image side 3 along an optical axis 4, has an aperture stop 80, a first lens element 10, a second lens element 20, a third lens element 30, a fourth lens element 40, a fifth lens element 50, a filter 70 and an image plane 71. Generally speaking, the first lens element 10, the second lens element 20 and the third lens element 30 maybe made of a transparent plastic material, but the present invention is not limited to this. The fourth lens element 40 and the fifth lens element 50 are made of a transparent plastic material. There are exclusively the first lens element 10, the second lens element 20, the third lens element 30, the fourth lens element 40 and the fifth lens element 50 with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 6, the aperture stop 80 is disposed between the object side 2 and the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50 and the filter 70. In the embodiments of the present invention, the optional filter 70 may be a filter of various suitable functions, for example, the filter 70 may be an infrared cut filter (IR cut filter), placed between the image-side surface 52 of the fifth lens element 50 and the image plane 71.

Each lens element in the optical imaging lens set 1 of the present invention has an object-side surface facing toward the object side as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) closer to the optical axis 4. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52.

Each lens element in the optical imaging lens set 1 of the present invention further has a central thickness T on the optical axis 4. For example, the first lens element 10 has a first lens element thickness $T_1$, the second lens element 20 has a second lens element thickness $T_2$, the third lens element 30 has a third lens element thickness $T_3$, the fourth lens element 40 has a fourth lens element thickness $T_4$, and the fifth lens element 50 has a fifth lens element thickness $T_5$. Therefore, the total thickness of all the lens elements in the optical imaging lens set 1 along the optical axis 4 is $ALT=T_1+T_2+T_3+T_4+T_5$.

In addition, between two adjacent lens elements in the optical imaging lens set 1 of the present invention there may be an air gap G along the optical axis 4. For example, an air gap $G_{23}$ is disposed between the second lens element 20 and the third lens element 30, an air gap $G_{34}$ is disposed between the third lens element 30 and the fourth lens element 40, an air gap $G_{45}$ is disposed between the fourth lens element 40 and the fifth lens element 50 but the air gap $G_{12}$ is zero because the first lens element 10 is glued to the second lens element 20. Therefore, the sum of total three air gaps between adjacent lens elements from the second lens element 10 to the fifth lens element 50 along the optical axis 4 is $AAG=G_{23}+G_{34}+G_{45}$.

In addition, the distance between the first object-side surface 11 of the first lens element 10 to the image plane 71, namely the total length of the optical imaging lens set along the optical axis 4 is TTL; $G_{max}$ is the max value of the air gaps from the first lens element 10 to the fifth lens element 50 along the optical axis 4; the effective focal length of the optical imaging lens set is EFL.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the Abbe number of the first lens element 10 is v1; the Abbe number of the second lens element 20 is v2; the Abbe number of the third lens element 30 is v3; and the Abbe number of the fourth lens element 40 is v4; the Abbe number of the fifth lens element 50 is v5.

First Example

Figures 7A, 7B, 7C, 7D:
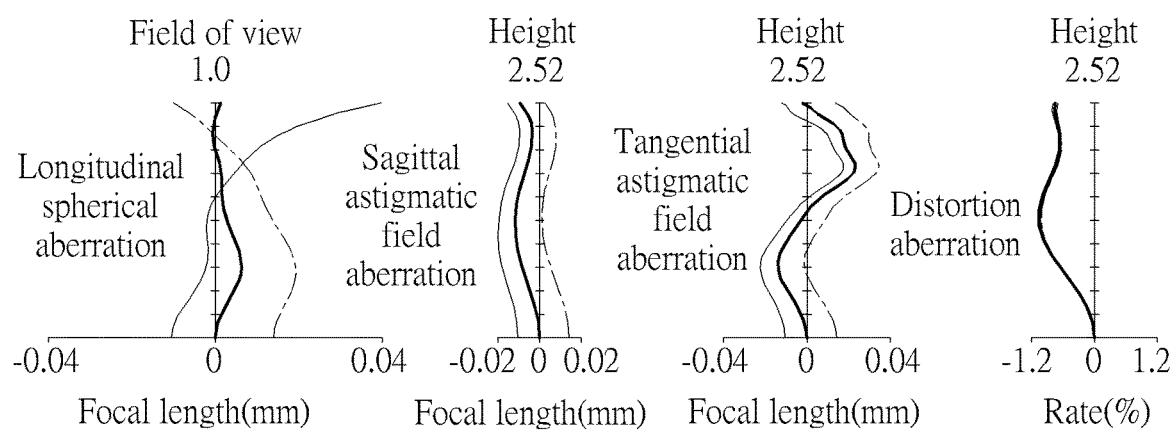
FIG. 7A illustrates the longitudinal spherical aberration on the image plane of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

Please refer to FIG. 6 which illustrates the first example of the optical imaging lens set 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stands for "image height", which is 2.52 mm. The length from the object-side surface 11 of the first lens element 10 to the image plane 71 along the optical axis 4 is 6.142 mm.

The optical imaging lens set 1 of the first example has five lens elements 10, 20, 30, 40 and 50 with refractive power. The optical imaging lens set 1 also has a filter 70, an aperture stop 80, and an image plane 71. The aperture stop 80 is provided between the object side 2 and the first lens element 10. The filter 70 may be an infrared filter (IR cut filter) to prevent inevitable infrared in light reaching the image plane to adversely affect the imaging quality.

The first lens element 10 has positive refractive power. The first object-side surface 11 facing toward the object side 2 has a convex part 13 in the vicinity of the optical axis and a convex part 14 in a vicinity of its circular periphery. The first image-side surface 12 facing toward the image side 3 has a concave part 16 in the vicinity of the optical axis and a concave part 17 in a vicinity of its circular periphery. Besides, the first object-side surface 11 of the first lens element 10 is aspherical and the first image-side 12 of the first lens element 10 is spherical.

The second lens element 20 has negative refractive power. The second object-side concave surface 21 facing toward the object side 2 has a convex part 23 in the vicinity of the optical axis and a convex part 24 in a vicinity of its circular periphery. The second image-side surface 22 facing toward the image side 3 has a concave part 26 in the vicinity of the optical axis and a concave part 27 in a vicinity of its circular periphery. The second object-side surface 21 of the second lens element 20 is spherical and the second image-side 22 of the second lens element 20 is aspherical. In particular, the first lens element 10 is glued to the second lens element 20 without an air gap.

The third lens element 30 has negative refractive power. The third object-side surface 31 facing toward the object side 2 has a convex part 33 in the vicinity of the optical axis and a concave part 34 in a vicinity of its circular periphery. The third image-side surface 32 facing toward the image side 3 has a concave part 36 in the vicinity of the optical axis and a concave part 37 in a vicinity of its circular periphery. Both the third object-side surface 31 and the third image-side 32 of the third lens element 30 are aspherical.

The fourth lens element 40 has negative refractive power. The fourth object-side surface 41 facing toward the object side 2 has a convex part 43 in the vicinity of the optical axis and a concave part 44 in a vicinity of its circular periphery. The fourth image-side surface 42 facing toward the image side 3 has a concave part 46 in the vicinity of the optical axis and a convex part 47 in a vicinity of its circular periphery. Both the fourth object-side surface 41 and the fourth image-side 42 of the fourth lens element 40 are aspherical.

The fifth lens element 50 has positive refractive power. The fifth object-side surface 51 facing toward the object side 2 has a convex part 53 in the vicinity of the optical axis and a concave part 54 in a vicinity of its circular periphery. The fifth image-side surface 52 facing toward the image side 3 has a concave part 56 in the vicinity of the optical axis and a convex part 57 in a vicinity of its circular periphery. Both the fifth object-side surface 51 and the fifth image-side 52 of the fifth lens element 50 are aspherical surfaces. The filter 70 maybe an infrared cut filter, and is disposed between the image-side surface 52 and the image plane 71.

In the optical imaging lens element 1 of the present invention, there are the object side 11/21/31/41/51 and image side 12/22/32/42/52 from the first lens element 10 to the fifth lens element 50. If a surface is aspherical, the aspheric coefficients are defined according to the following formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

In which:
R represents the curvature radius of the lens element surface;
Z represents the depth of an aspherical surface (the perpendicular distance between the point of the aspherical surface at a distance
Y from the optical axis and the tangent plane of the vertex on the optical axis of the aspherical surface);
Y represents a vertical distance from a point on the aspherical surface to the optical axis;
K is a conic constant;
$a_{2i}$ is the aspheric coefficient of the 2i order.

The optical data of the first example of the optical imaging lens set 1 are shown in FIG. 30 while the aspheric surface data are shown in FIG. 31. In the present examples of the optical imaging lens set, the f-number of the entire optical lens element system is Fno, EFL is the effective focal length, HFOV stands for the half field of view which is half of the field of view of the entire optical lens element system, and the unit for the curvature radius, the thickness and the focal length is in millimeters (mm). Fno is 2.80. The image height is 2.52 mm. HFOV is 21.114 degrees.

The length of the optical imaging lens set is effectively reduced to effectively overcome aberration and to provide better imaging quality so the first example is able to reduce the system length efficiently and to maintain a sufficient optical performance.

Some important ratios of the first example are as follows:
ALT/Gmax=2.200
$(G_{23}+G_{45})/T_4$=2.500
AAG/$G_{34}$=2.863
$(G_{23}+G_{34})/T_2$=7.420
ALT/$T_5$=5.400
$T_1/G_{34}$=1.381
$G_{23}/(T_2+T_5)$=1.601
AAG/$(T_3+T_5)$=2.572
ALT/$(T_3+T_4)$=3.014
$(T_4+T_5)/G_{34}$=1.411
EFL/$(G_{23}+G_{34})$=3.401
$G_{23}/T_3$=3.650
$(G_{34}+G_{45})/T_2$=3.462

$ALT/T_1=2.602$
$EFL/(T_1+T_2)=5.159$

Second Example

Figure 8:
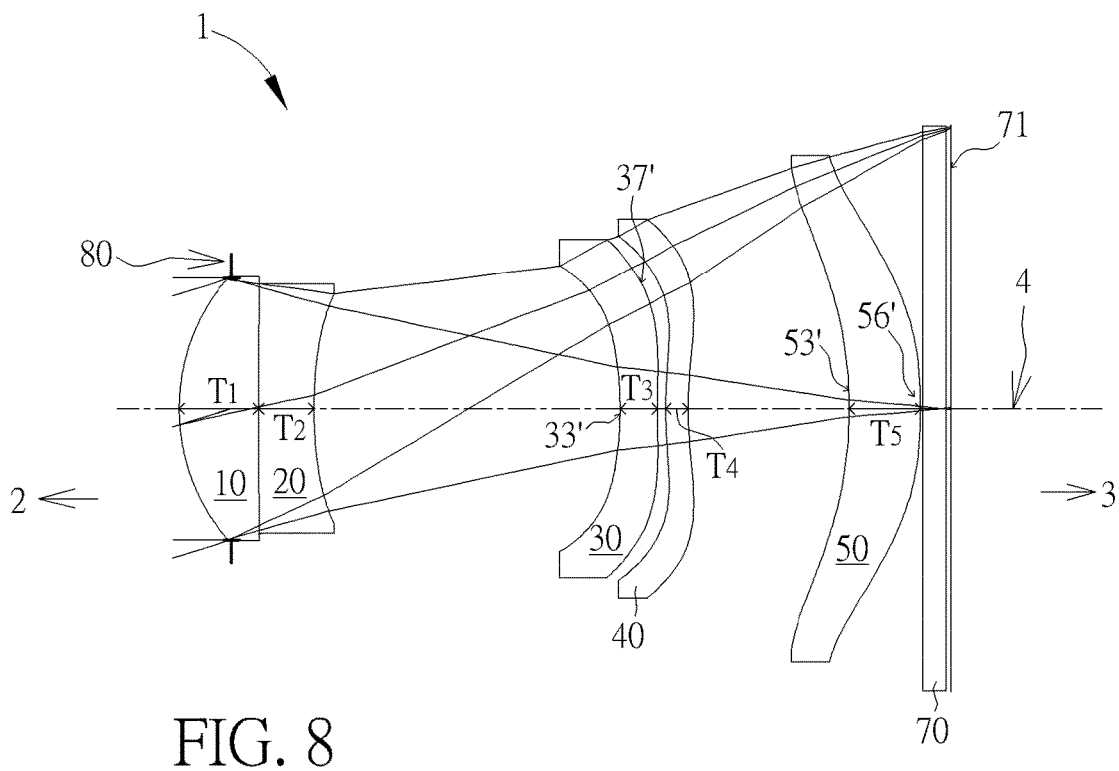
FIG. 8 illustrates a second example of the optical imaging lens set of five lens elements of the present invention.
Figures 9A, 9B, 9C, 9D:
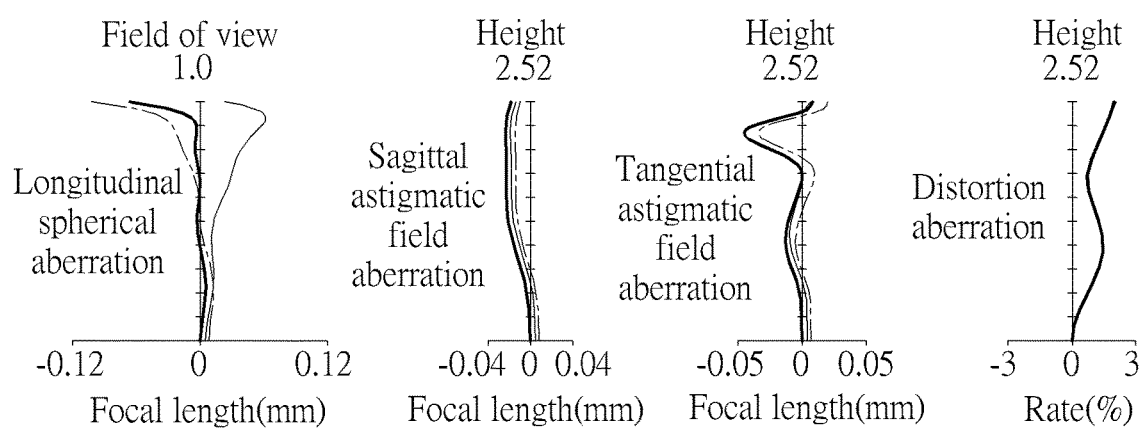
FIG. 9A illustrates the longitudinal spherical aberration on the image plane of the second example.
FIG. 9B illustrates the astigmatic aberration on the sagittal direction of the second example.
FIG. 9C illustrates the astigmatic aberration on the tangential direction of the second example.
FIG. 9D illustrates the distortion aberration of the second example.

Please refer to FIG. 8 which illustrates the second example of the optical imaging lens set 1 of the present invention. It is noted that from the second example to the following examples, in order to simplify the figures, only the components different from what the first example has, and the basic lens elements will be labeled in the following figures. Other components that are the same as what the first example has, such as the object-side surface, the image-side surface, the part in a vicinity of the optical axis and the part in a vicinity of its circular periphery will be omitted in the following examples. Please refer to FIG. 9A for the longitudinal spherical aberration on the image plane 71 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, the third object-side surface 31 facing toward the object side 2 has a concave part 33' in the vicinity of the optical axis and the third image-side surface 32 facing toward the image side 3 has a convex part 37' in a vicinity of its circular periphery; the fifth object-side surface 51 facing toward the object side 2 has a concave part 53' in the vicinity of the optical axis and the fifth image-side surface 52 facing toward the image side 3 has a convex part 56' in the vicinity of the optical axis. In particular, the second example is easier to be fabricated so the yield would be better.

The optical data of the second example of the optical imaging lens set are shown in FIG. 32 while the aspheric surface data are shown in FIG. 33. The length from the object-side surface 11 of the first lens element 10 to the image plane 71 along the optical axis 4 is 6.912 mm. The image height is 2.52 mm. Fno is 3.38. HFOV is 17.025 degrees.

Some important ratios of the second example are as follows:
$ALT/Gmax=0.878$
$(G_{23}+G_{45})/T_4=20.633$
$AAG/G_{34}=58.991$
$(G_{23}+G_{34})/T_2=5.809$
$ALT/T_5=3.694$
$T_1/G_{34}=10.000$
$G_{23}/(T_2+T_5)=2.413$
$AAG/(T_3+T_5)=4.251$
$ALT/(T_3+T_4)=4.370$
$(T_4+T_5)/G_{34}=11.854$
$EFL/(G_{23}+G_{34})=2.870$
$G_{23}/T_3=7.869$
$(G_{34}+G_{45})/T_2=3.119$
$ALT/T_1=3.341$
$EFL/(T_1+T_2)=6.700$ Third Example Please refer to FIG. 10 which illustrates the third example of the optical imaging lens set 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the third image-side surface 32 facing toward the image side 3 has a convex part 37' in a vicinity of its circular periphery. In particular, 1) the TTL of the third example is shorter than that of the first example of the present invention. 2) The third example is easier to be fabricated than the first example so the yield would be better.

The optical data of the third example of the optical imaging lens set are shown in FIG. 34 while the aspheric surface data are shown in FIG. 35. The length from the object-side surface 11 of the first lens element 10 to the image plane 71 along the optical axis 4 is 6.123 mm. The image height is 2.52 mm. Fno is 2.80. HFOV is 20.786 degrees.

Figure 12:
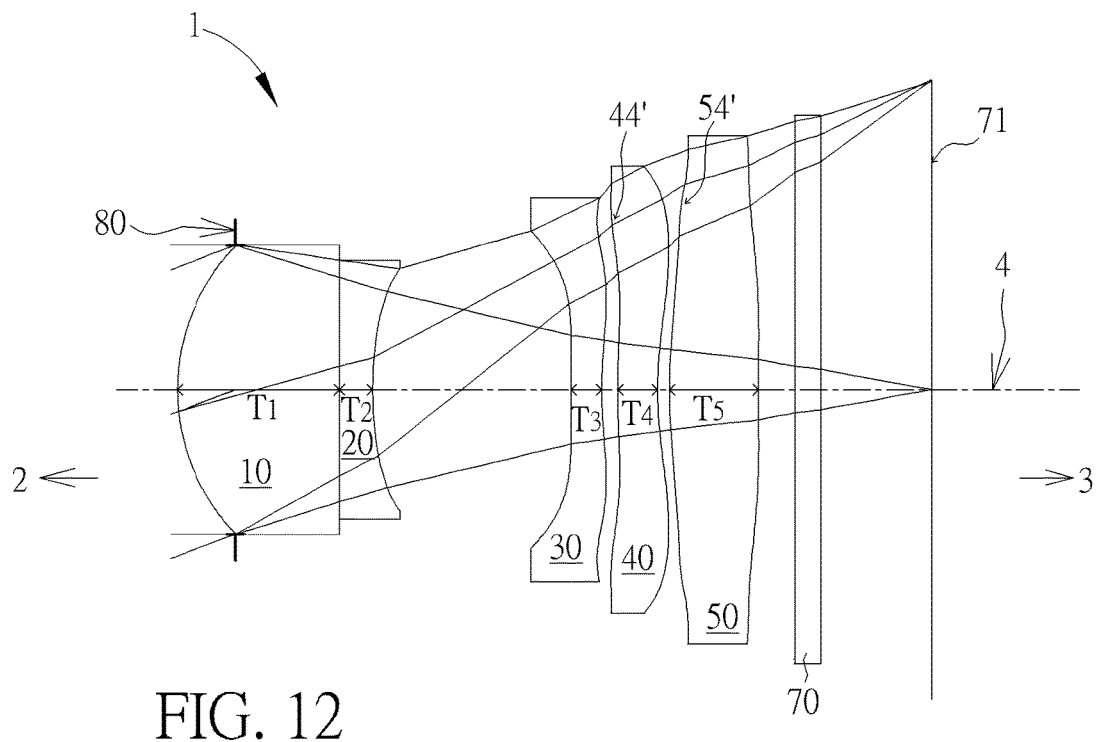
FIG. 12 illustrates a fourth example of the optical imaging lens set of five lens elements of the present invention.
Figures 13A, 13B, 13C, 13D:
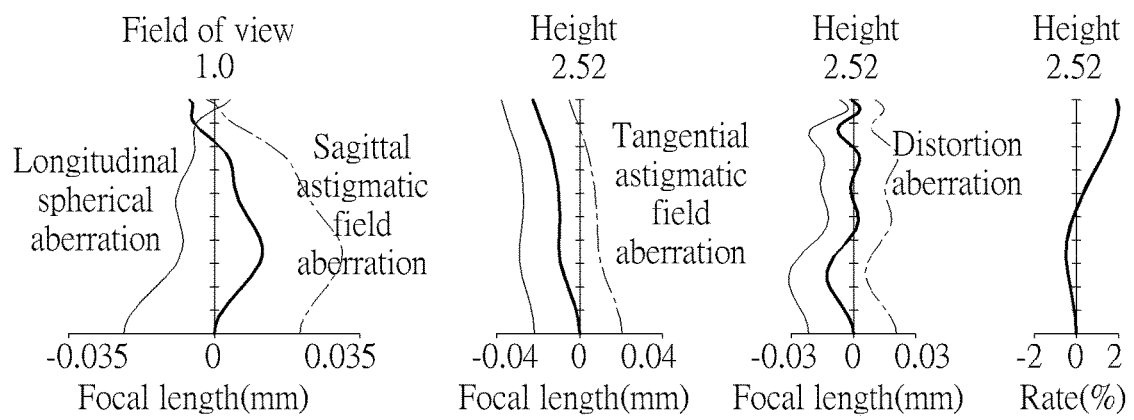
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Some important ratios of the third example are as follows:
$ALT/Gmax=1.712$
$(G_{23}+G_{45})/T_4=4.335$
$AAG/G_{34}=4.665$
$(G_{23}+G_{34})/T_2=5.927$
$ALT/T_5=4.368$
$T_1/G_{34}=2.313$
$g_{23}/(T_2+T_5)=1.641$
$AAG/(T_3+T_5)=2.321$
$ALT/(T_3+T_4)=3.947$
$(T_4+T_5)/G_{34}=2.200$
$EFL/(G_{23}+G_{34})=3.239$
$G_{23}/T_3=5.285$
$(G_{34}+G_{45})/T_2=1.605$
$ALT/T_1=2.559$
$EFL/(T_1+T_2)=4.711$ Fourth Example Please refer to FIG. 12 which illustrates the fourth example of the optical imaging lens set 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the fourth object-side surface 41 facing toward the object side 2 has a convex part 44' in a vicinity of its circular periphery; the fifth object-side surface 51 facing toward the object side 2 has a convex part 54' in a vicinity of its circular periphery. In particular, 1) the TTL of the fourth example is shorter than that of the first example of the present invention. 2) The fourth example is easier to be fabricated than the first example so the yield would be better.

The optical data of the second example of the optical imaging lens set are shown in FIG. 36 while the aspheric surface data are shown in FIG. 37. The length from the object-side surface 11 of the first lens element 10 to the image plane 71 along the optical axis 4 is 6.120 mm. The image height is 2.52 mm. Fno is 2.77. HFOV is 20.781 degrees.

Some important ratios of the fourth example are as follows:
ALT/Gmax=1.778
$(G_{23}+G_{45})/T_4$=5.320
AAG/$G_{34}$=13.985
$(G_{23}+G_{34})/T_2$=6.712
ALT/$T_5$=3.970
$T_1/G_{34}$=10.000
$G_{23}/(T_2+T_5)$=1.642
AAG/$(T_3+T_5)$=1.895
ALT/$(T_3+T_4)$=5.033
$(T_4+T_5)/G_{34}$=7.931
EFL/$(G_{23}+G_{34})$=3.725
$G_{23}/T_3$=6.488
$(G_{34}+G_{45})/T_2$=0.874
ALT/$T_1$=2.180
EFL/$(T_1+T_2)$=4.124

Fifth Example

Figure 14:
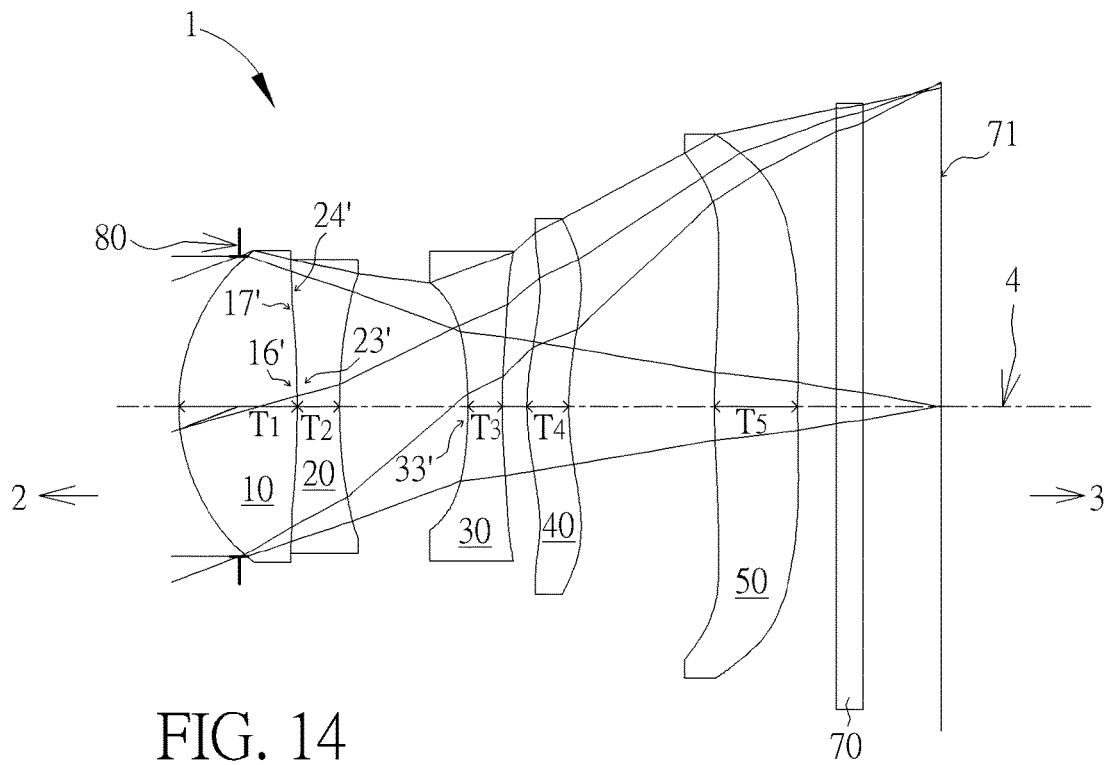
FIG. 14 illustrates a fifth example of the optical imaging lens set of five lens elements of the present invention.
Figures 15A, 15B, 15C, 15D:
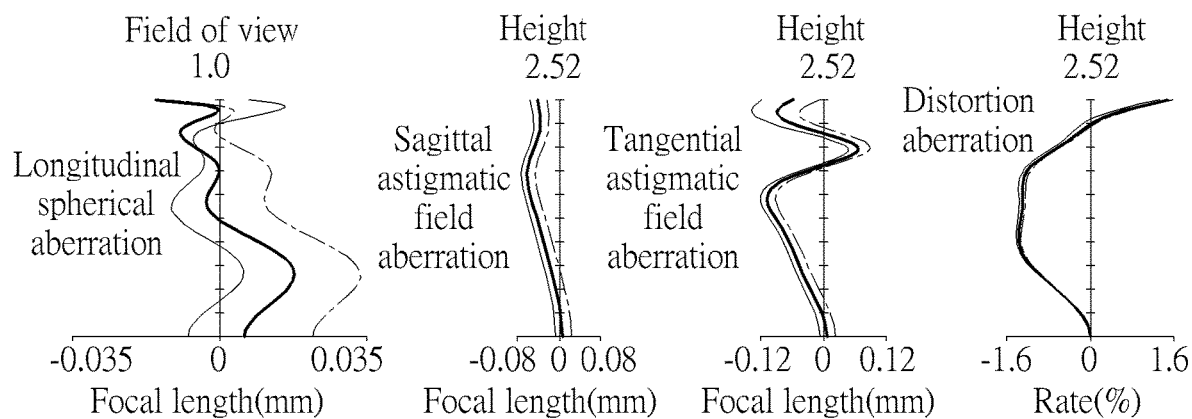
FIG. 15A illustrates the longitudinal spherical aberration on the image plane of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens set 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example. In this example, the first image-side surface 12 facing toward the image side 3 has a convex part 16' in the vicinity of the optical axis and a convex part 17' in a vicinity of its circular periphery; the second object-side surface 21 facing toward the object side 2 has a concave part 23' in the vicinity of the optical axis and a concave part 24' in a vicinity of its circular periphery; the third object-side surface 31 facing toward the object side 2 has a concave part 33' in the vicinity of the optical axis; the fourth lens element 40 has positive refractive power. In particular, 1) the TTL of the fifth example is shorter than that of the first example of the present invention. 2) The fifth example is easier to be fabricated than the first example so the yield would be better.

The optical data of the fifth example of the optical imaging lens set are shown in FIG. 38 while the aspheric surface data are shown in FIG. 39. The length from the object-side surface 11 of the first lens element 10 to the image plane 71 along the optical axis 4 is 5.938 mm. The image height is 2.52 mm. Fno is 2.77. HFOV is 20.716 degrees.

Some important ratios of the fifth example are as follows:
ALT/Gmax=2.200
$(G_{23}+G_{45})/T_4$=6.561
AAG/$G_{34}$=12.034
$(G_{23}+G_{34})/T_2$=3.502
ALT/$T_5$=3.824
$T_1/G_{34}$=4.676
$G_{23}/(T_2+T_5)$=1.008
AAG/$(T_3+T_5)$=2.521
ALT/$(T_3+T_4)$=4.181
$(T_4+T_5)/G_{34}$=5.054
EFL/$(G_{23}+G_{34})$=5.496
$G_{23}/T_3$=3.690
$(G_{34}+G_{45})/T_2$=3.892
ALT/$T_1$=2.758
EFL/$(T_1+T_2)$=5.270

Sixth Example

Figure 16:
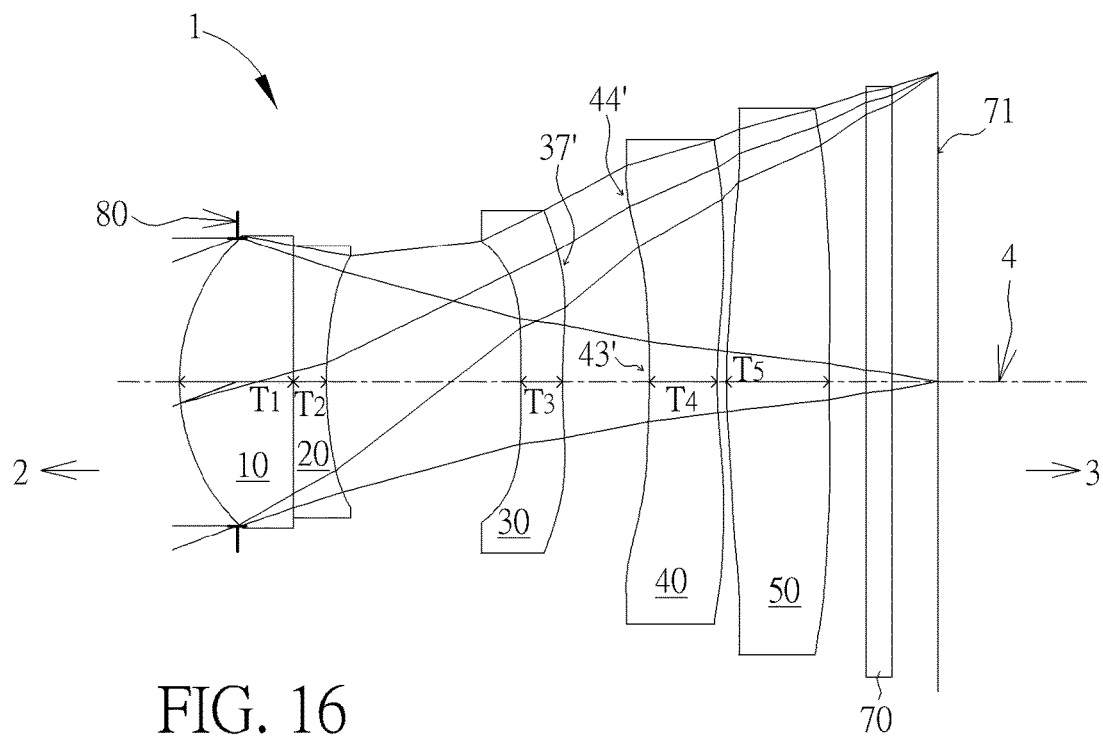
FIG. 16 illustrates a sixth example of the optical imaging lens set of five lens elements of the present invention.
Figures 17A, 17B, 17C, 17D:
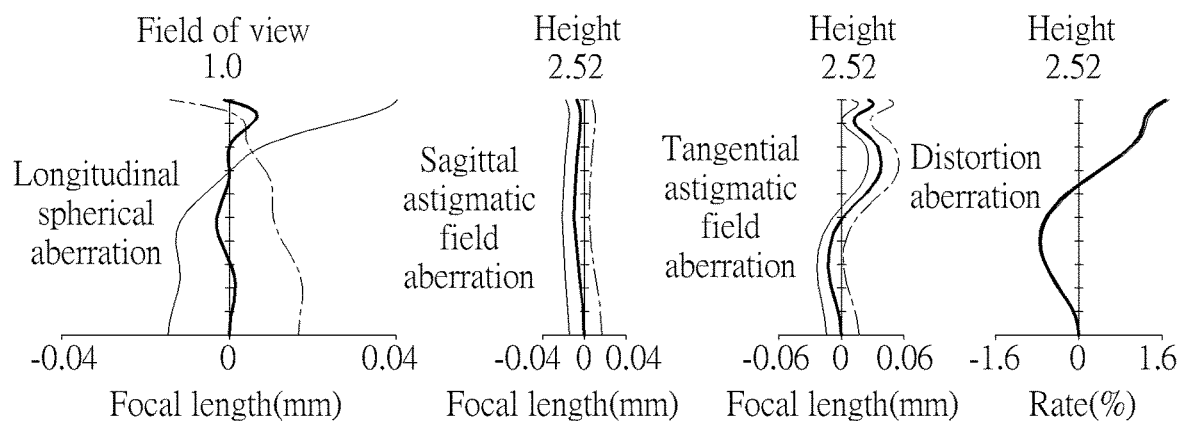
FIG. 17A illustrates the longitudinal spherical aberration on the image plane of the sixth example.
FIG. 17B illustrates the astigmatic aberration on the sagittal direction of the sixth example.
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens set 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the third image-side surface 32 facing toward the image side 3 has a convex part 37' in a vicinity of its circular periphery; the fourth object-side surface 41 facing toward the object side 2 has a concave part 43' in the vicinity of the optical axis and a convex part 44' in a vicinity of its circular periphery. In particular, the sixth example is easier to be fabricated than the first example so the yield would be better.

The optical data of the sixth example of the optical imaging lens set are shown in FIG. 40 while the aspheric surface data are shown in FIG. 41. The length from the object-side surface 11 of the first lens element 10 to the image plane 71 along the optical axis 4 is 6.175 mm. The image height is 2.52 mm. Fno is 2.79. HFOV is 20.681 degrees.

Some important ratios of the sixth example are as follows:
ALT/Gmax=1.854
$(G_{23}+G_{45})/T_4$=2.953
AAG/$G_{34}$=3.386
$(G_{23}+G_{34})/T_2$=8.766
ALT/$T_5$=3.488
$T_1/G_{34}$=1.339
$G_{23}/(T_2+T_5)$=1.438
AAG/$(T_3+T_5)$=1.992
ALT/$(T_3+T_4)$=3.252
$(T_4+T_5)/G_{34}$=2.018
EFL/$(G_{23}+G_{34})$=2.874
$G_{23}/T_3$=4.646
$(G_{34}+G_{45})/T_2$=2.967
ALT/$T_1$=3.152
EFL/$(T_1+T_2)$=5.498

Seventh Example

Please refer to FIG. 18 which illustrates the seventh example of the optical imaging lens set 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the first example, but the optical data such as the curvature radius, the refractive power, the lens thickness, the lens focal length, the aspheric surface or the back focal length in this example are different from the optical data in the first example. In this example, the first image-side surface 12 facing toward the image side 3 has a convex part 16' in the vicinity of the optical axis and a convex part 17' in a vicinity of its circular periphery; the second object-side concave surface 21 facing toward the object side 2 has a concave part 23' in the vicinity of the optical axis and a concave part 24' in a vicinity of its circular periphery; the third object-side surface 31 facing toward the object side 2 has a concave part 33' in the vicinity of the optical axis and the third image-side surface 32 facing toward the image side 3 has a convex part 36' in the vicinity of the optical axis; the fourth object-side surface 41 facing toward the object side 2 has a concave part 43' in the vicinity of the optical axis. In particular, the TTL of the seventh example is shorter than that of the first example of the present invention.

The optical data of the seventh example of the optical imaging lens set are shown in FIG. 42 while the aspheric surface data are shown in FIG. 43. The length from the object-side surface 11 of the first lens element 10 to the image plane 71 along the optical axis 4 is 5.890 mm. The image height is 2.52 mm. Fno is 2.81. HFOV is 20.904 degrees.

Some important ratios of the sixth example are as follows:
ALT/Gmax=1.613
$(G_{23}+G_{45})/T_4$=3.484
AAG/$G_{34}$=5.017
$(G_{23}+G_{34})/T_2$=7.099
ALT/$T_5$=4.244
$T_1/G_{34}$=1.955
$G_{23}/(T_2+T_5)$=1.795
AAG/$(T_3+T_5)$=2.001
ALT/$(T_3+T_4)$=2.901
$(T_4+T_5)/G_{34}$=2.639
EFL/$(G_{23}+G_{34})$=3.116
$G_{23}/T_3$=3.829
$(G_{34}+G_{45})/T_2$=1.601
ALT/$T_1$=3.226
EFL/$(T_1+T_2)$=5.780

Eighth Example

Please refer to FIG. 20 which illustrates the eighth example of the optical imaging lens set 1 of the present invention. Please refer to FIG. 21A for the longitudinal spherical aberration on the image plane 71 of the eighth example; please refer to FIG. 21B for the astigmatic aberration on the sagittal direction; please refer to FIG. 21C for the astigmatic aberration on the tangential direction, and please refer to FIG. 21D for the distortion aberration. The components in the eighth example are similar to those in the first example, but the optical data such as the curvature radius, the refractive power, the lens thickness, the lens focal length, the aspheric surface or the back focal length in this example are different from the optical data in the first example, and in this example, the first image-side surface 12 facing toward the image side 3 has a convex part 16' in the vicinity of the optical axis and a convex part 17' in a vicinity of its circular periphery; the second object-side concave surface 21 facing toward the object side 2 has a concave part 23' in the vicinity of the optical axis and a concave part 24' in a vicinity of its circular periphery; the third object-side surface 31 facing toward the object side 2 has a concave part 33' in the vicinity of the optical axis; the fourth lens element 40 has positive refractive power. In particular, 1) the TTL of the eighth example is shorter than that of the first example of the present invention. 2) The eighth example is easier to be fabricated than the first example so the yield would be better.

The optical data of the eighth example of the optical imaging lens set are shown in FIG. 44 while the aspheric surface data are shown in FIG. 45. The length from the object-side surface 11 of the first lens element 10 to the image plane 71 along the optical axis 4 is 5.980 mm. The image height is 2.52 mm. Fno is 2.80. HFOV is 20.671 degrees.

Some important ratios of the eighth example are as follows:
ALT/Gmax=2.200
$(G_{23}+G_{45})/T_4$=6.261
AAG/$G_{34}$=11.725
$(G_{23}+G_{34})/T_2$=3.703
ALT/$T_5$=3.700
$T_1/G_{34}$=4.474
$G_{23}/(T_2+T_5)$=1.000
AAG/$(T_3+T_5)$=2.472
ALT/$(T_3+T_4)$=4.099
$(T_4+T_5)/G_{34}$=5.106
EFL/$(G_{23}+G_{34})$=5.496
$G_{23}/T_3$=3.717
$(G_{34}+G_{45})/T_2$=4.128
ALT/$T_1$=2.806
EFL/$(T_1+T_2)$=5.423

Ninth Example

Please refer to FIG. 22 which illustrates the ninth example of the optical imaging lens set 1 of the present invention. Please refer to FIG. 23A for the longitudinal spherical aberration on the image plane 71 of the ninth example; please refer to FIG. 23B for the astigmatic aberration on the sagittal direction; please refer to FIG. 23C for the astigmatic aberration on the tangential direction, and please refer to FIG. 23D for the distortion aberration. The components in the ninth example are similar to those in the first example, but the optical data such as the curvature radius, the refractive power, the lens thickness, the lens focal length, the aspheric surface or the back focal length in this example are different from the optical data in the first example, and in this example, the first image-side surface 12 facing toward the image side 3 has a convex part 16' in the vicinity of the optical axis and a convex part 17' in a vicinity of its circular periphery; the second object-side concave surface 21 facing toward the object side 2 has a concave part 23' in the vicinity of the optical axis and a concave part 24' in a vicinity of its circular periphery; the third object-side surface 31 facing toward the object side 2 has a concave part 33' in the vicinity of the optical axis; the fourth object-side surface 41 facing toward the object side 2 has a concave part 43' in the vicinity of the optical axis. In particular, the TTL of the ninth example is shorter than that of the first example of the present invention.

The optical data of the ninth example of the optical imaging lens set are shown in FIG. 46 while the aspheric surface data are shown in FIG. 47. The length from the object-side surface 11 of the first lens element 10 to the image plane 71 along the optical axis 4 is 5.940 mm. The image height is 2.52 mm. Fno is 2.81. HFOV is 20.704 degrees.

Some important ratios of the ninth example are as follows:
ALT/Gmax=2.145
$(G_{23}+G_{45})/T_4$=2.513

$AAG/G_{34}=1.897$
$(G_{23}+G_{34})/T_2=9.271$
$ALT/T_5=4.029$
$T_1/G_{34}=0.758$
$G_{23}/(T_2+T_5)=1.060$
$AAG/(T_3+T_5)=2.262$
$ALT/(T_3+T_4)=3.233$
$(T_4+T_5)/G_{34}=0.889$
$EFL/(G_{23}+G_{34})=3.095$
$G_{23}/T_3=2.500$
$(G_{34}+G_{45})/T_2=5.936$
$ALT/T_1=2.828$
$EFL/(T_1+T_2)=5.761$

Tenth Example

Please refer to FIG. 24 which illustrates the tenth example of the optical imaging lens set 1 of the present invention. Please refer to FIG. 25A for the longitudinal spherical aberration on the image plane 71 of the tenth example; please refer to FIG. 25B for the astigmatic aberration on the sagittal direction; please refer to FIG. 25C for the astigmatic aberration on the tangential direction, and please refer to FIG. 25D for the distortion aberration. The components in the tenth example are similar to those in the first example, but the optical data such as the curvature radius, the refractive power, the lens thickness, the lens focal length, the aspheric surface or the back focal length in this example are different from the optical data in the first example, and in this example, the third object-side surface 31 facing toward the object side 2 has a concave part 33' in the vicinity of the optical axis and the third image-side surface 32 facing toward the image side 3 has a convex part 36' in the vicinity of the optical axis; the fourth object-side surface 1 facing toward the object side 2 has a part concave 43' in the vicinity of the optical axis and the fourth image-side surface 42 facing toward the image side 3 has a convex part 46' in the vicinity of the optical axis; the fifth lens element 50 has negative refractive power and the fifth object-side surface 51 facing toward the object side 2 has a concave part 53' in the vicinity of the optical axis. In particular, 1) the TTL of the tenth example is shorter than that of the first example of the present invention. 2) The tenth example is easier to be fabricated than the first example so the yield would be better.

The optical data of the tenth example of the optical imaging lens set are shown in FIG. 48 while the aspheric surface data are shown in FIG. 49. The length from the object-side surface 11 of the first lens element 10 to the image plane 71 along the optical axis 4 is 5.897 mm. The image height is 2.52 mm. Fno is 2.81. HFOV is 20.873 degrees.

Some important ratios of the tenth example are as follows:
$ALT/Gmax=1.388$
$(G_{23}+G_{45})/T_4=3.617$
$AAG/G_{34}=5.401$
$(G_{23}+G_{34})/T_2=6.921$
$ALT/T_5=3.594$
$T_1/G_{34}=1.420$
$G_{23}/(T_2+T_5)=1.767$
$AAG/(T_3+T_5)=2.342$
$ALT/(T_3+T_4)=2.922$
$(T_4+T_5)/G_{34}=2.796$
$EFL/(G_{23}+G_{34})=2.717$
$G_{23}/T_3=5.633$
$(G_{34}+G_{45})/T_2=1.780$
$ALT/T_1=4.000$
$EFL/(T_1+T_2)=6.419$ Eleventh Example Please refer to FIG. 26 which illustrates the eleventh example of the optical imaging lens set 1 of the present invention. Please refer to FIG. 27A for the longitudinal spherical aberration on the image plane 71 of the eleventh example; please refer to FIG. 27B for the astigmatic aberration on the sagittal direction; please refer to FIG. 27C for the astigmatic aberration on the tangential direction, and please refer to FIG. 27D for the distortion aberration. The components in the eleventh example are similar to those in the first example, but the optical data such as the curvature radius, the refractive power, the lens thickness, the lens focal length, the aspheric surface or the back focal length in this example are different from the optical data in the first example, and in this example, the third object-side surface 31 facing toward the object side 2 has a concave part 33' in the vicinity of the optical axis and the third image-side surface 32 facing toward the image side 3 has a convex part 36' in the vicinity of the optical axis; the fourth object-side surface 41 facing toward the object side 2 has a part concave 43' in the vicinity of the optical axis. In particular, 1) the TTL of the eleventh example is shorter than that of the first example of the present invention. 2) The eleventh example is easier to be fabricated than the first example so the yield would be better.

The optical data of the eleventh example of the optical imaging lens set are shown in FIG. 50 while the aspheric surface data are shown in FIG. 51. The length from the object-side surface 11 of the first lens element 10 to the image plane 71 along the optical axis 4 is 5.940 mm. The image height is 2.52 mm. Fno is 2.81. HFOV is 20.798 degrees.

Some important ratios of the eleventh example are as follows: s
$ALT/Gmax=1.318$
$(G_{23}+G_{45})/T_4=4.785$
$AAG/G_{34}=6.536$
$(G_{23}+G_{34})/T_2=10.806$
$ALT/T_5=3.818$
$T_1/G_{34}=2.100$
$G_{23}/(T_2+T_5)=2.194$
$AAG/(T_3+T_5)=2.208$
$ALT/(T_3+T_4)=2.900$
$(T_4+T_5)/G_{34}=2.934$
$EFL/(G_{23}+G_{34})=2.891$
$G_{23}/T_3=4.351$
$(G_{34}+G_{45})/T_2=2.440$
$ALT/T_1=3.232$
$EFL/(T_1+T_2)=6.659$ Some important ratios in each example are shown in FIG. 52. The distance between the fifth image-side surface 52 of the fifth lens element 50 to the filter 70 along the optical axis 4 is G5F; the thickness of the filter 70 along the optical axis 4 is TF; the distance between the filter 70 to the image plane 71 along the optical axis 4 is GFP; the distance between the fifth image-side surface 52 of the fifth lens element 50 to the image plane 71 along the optical axis 4 is BFL. Therefore, BFL=G5F+TF+GFP.

In the light of the above examples, the inventors observe the following features:
1) The location of the aperture stop has to go with conditional parameters such as the curvatures of each lens element, the thickness of each lens element and the air gaps between adjacent lens elements to maintain good imaging quality. The first lens element of the present invention has a first object-side surface facing toward the object side and the first object-side surface a convex part in the vicinity of the optical axis to go with the aperture stop at the object-side of the first lens element to effectively concentrate the light and to decrease the length of the optical imaging lens set.

2) The second lens element 20 has a second image-side surface facing toward the image side and the second image-side surface has a concave part 27 in a vicinity of its circular periphery to go with the third object-side surface 31 facing toward the object side 2 and having a concave part 34 in a vicinity of its circular periphery to correct the angle of light and to reduce aberration.

3. The present invention in particular arrange the first lens element 10 glued to the second lens element 20 to effective increase the critical angle of the total reflection to decrease light to scatter.

In addition, it is found that there are some better ratio ranges for different optical data according to the above various important ratios. Better ratio ranges help the designers to design the better optical performance, effectively reduced length, good quality of zoom-out images, wide viewing angle, smaller f-number, and a technically possible optical imaging lens set. A good ratio helps to control the lens thickness or the air gaps to maintain a suitable range and keeps a lens element from being too thick to facilitate the reduction of the overall size or too thin to assemble the optical imaging lens set. For example:

1. $ALT/G_{max} \leq 2.2$, a preferable range may be 0.8~2.2;
2. $(G_{23}+G_{45})/T_4 \geq 2.5$, a preferable range may be 2.5~20.7;
3. $AAG/G_{34} \leq 60$, a preferable range may be 1.8~60;
4. $(G_{23}+G_{34})/T_2 \leq 3.5$, a preferable range may be 3.5~10.9;
5. $ALT/T_5 \leq 5.4$, a preferable range may be 3.4~5.4;
6. $T_1/G_{34} \leq 10.0$, a preferable range may be 0.7~10.0;
7. $G_{23}/(T_2+T_5) \geq 1.0$, a preferable range may be 1.0~2.5;
8. $AAG/(T_3+T_5) \geq 1.8$, a preferable range may be 1.8~4.3;
9. $ALT/(T_3+T_4) \geq 2.9$, a preferable range may be 2.9~5.1;
10. $(T_4+T_5)/G_{34} \leq 30.0$, a preferable range may be 0.8~30.0;
11. $EFL/(G_{23}+G_{34}) \leq 5.5$, a preferable range may be 2.7~5.5;
12. $G_{23}/T_3 \geq 2.5$, a preferable range may be 2.5~7.9;
13. $(G_{34}+G_{45})/T_2 \geq 0.8$, a preferable range may be 0.8~6.0;
14. $ALT/T_1 \leq 4.0$, a preferable range may be 2.1~4.0;
15. $EFL/(T_1+T_2) \leq 6.7$, a preferable range may be 4.1~6.7.

In the light of the unpredictability of the optical imaging lens set, the present invention suggests the above principles. The accordance of the principles preferably helps decrease the TTL, increase the aperture stop available, increase the HFOV, increase the imaging quality and increase the yield of the assembling to overcome the drawbacks of prior art. The above limitations may be properly combined at the discretion of persons who practice the present invention and they are not limited as shown above. To note that, in addition to the above curvatures or ratios, the curvatures in the examples may go with the refractive power to enhance the system performance and/or resolution and to increase the yield. For example, the positive refractive power of the first lens element 10 goes with the negative refractive power of the second lens element 20 to effectively concentrate the light.

Figure 28:
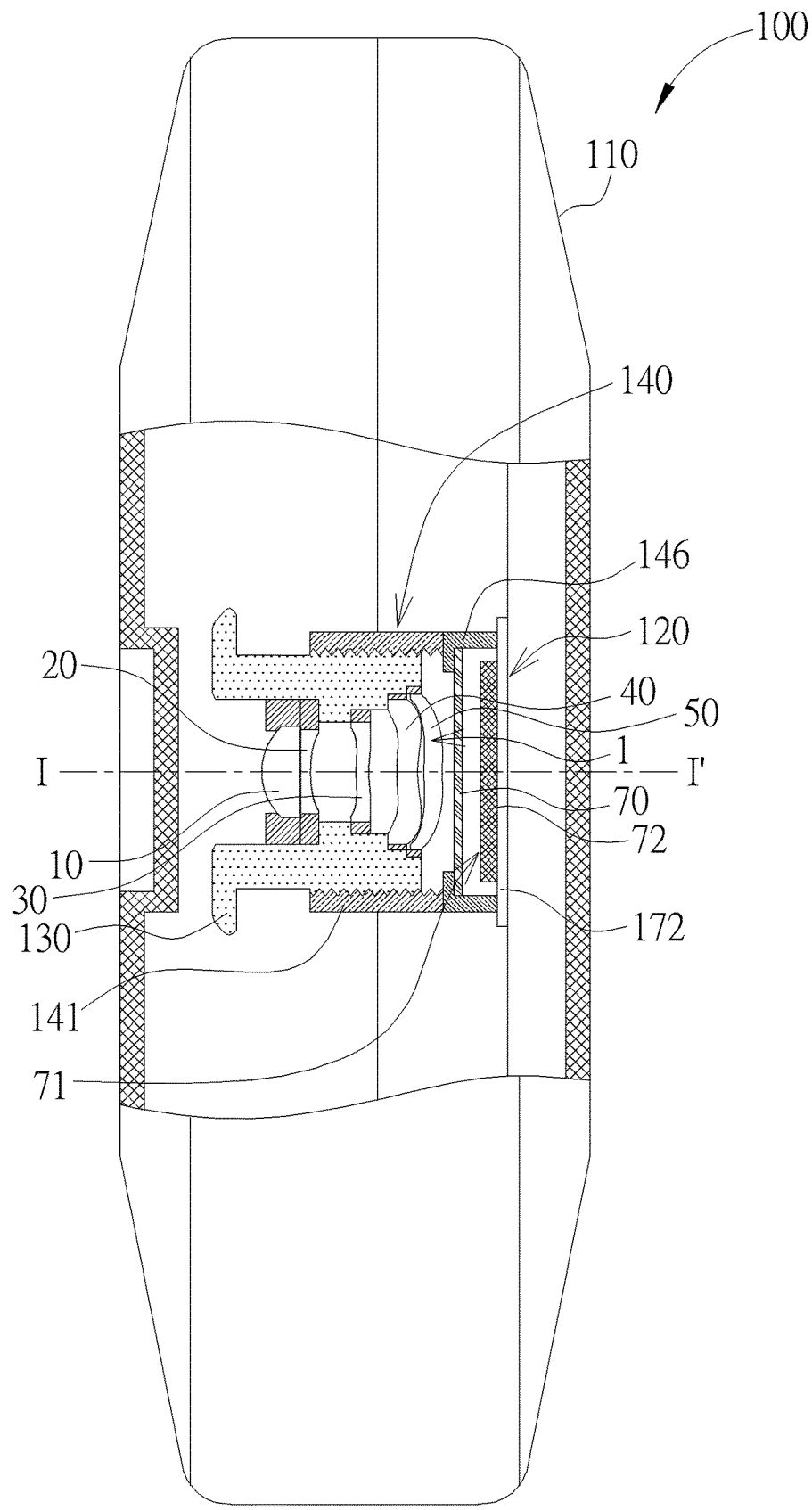
FIG. 28 illustrates a first preferred example of the portable electronic device with an optical imaging lens set of the present invention.

The optical imaging lens set 1 of the present invention may be applied to a portable electronic device. Please refer to FIG. 28. FIG. 28 illustrates a first preferred example of the optical imaging lens set 1 of the present invention for use in a portable electronic device 100. The portable electronic device 100 includes a case 110, and an image module 120 mounted in the case 110. A mobile phone is illustrated in FIG. 28 as an example, but the portable electronic device 100 is not limited to a mobile phone.

As shown in FIG. 28, the image module 120 includes the optical imaging lens set 1 as described above. FIG. 28 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 70 may be omitted in other examples although the optional filter 70 is present in this example. The case 110, the barrel 130, and/or the module housing unit 140 may be a single element or consist of a plurality of elements, but the present invention is not limited to this.

Each one of the five lens elements 10, 20, 30, 40 and 50 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 29:
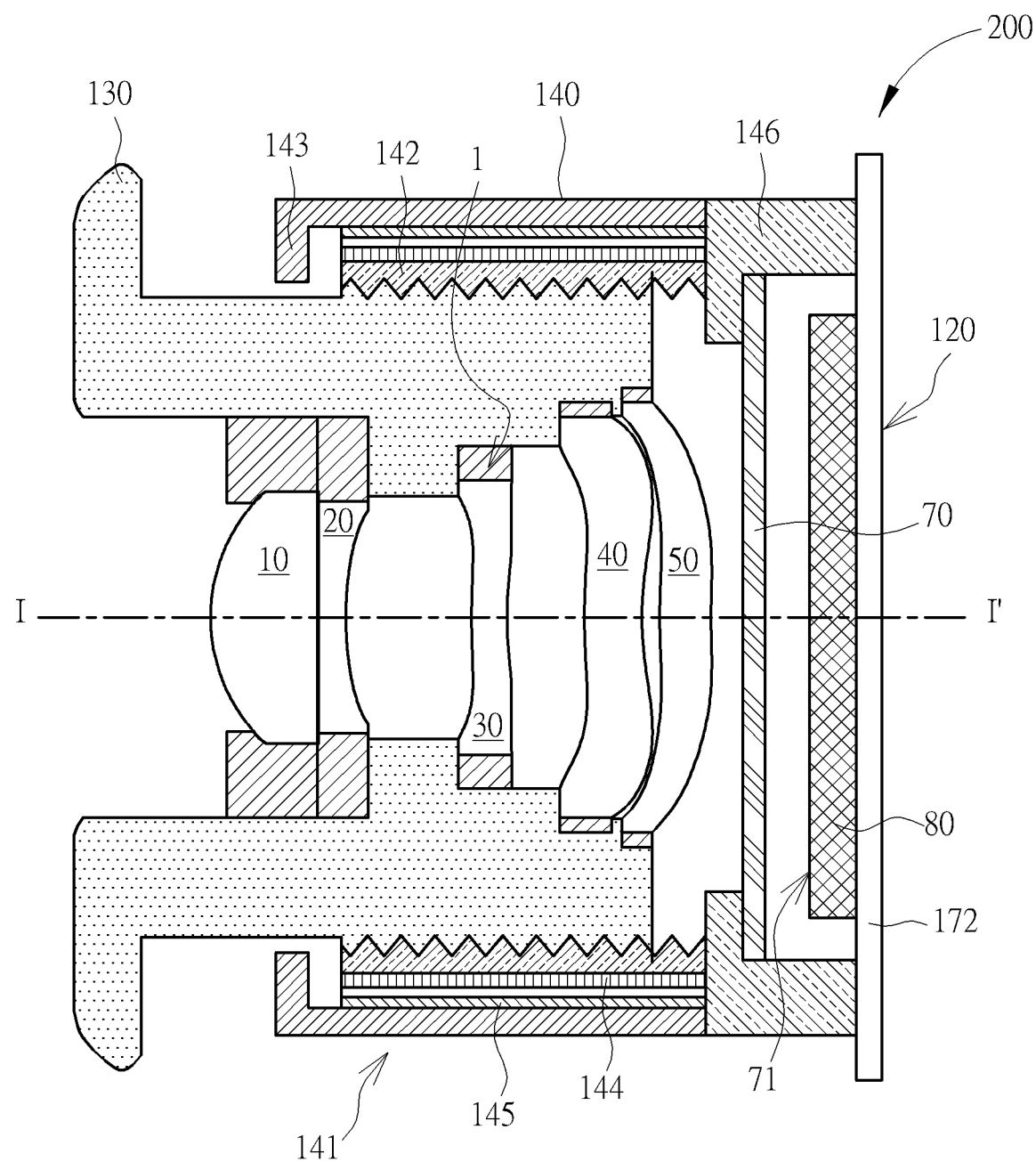
FIG. 29 illustrates a second preferred example of the portable electronic device with an optical imaging lens set of the present invention.

Please also refer to FIG. 29 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 70, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, a third lens element, a fourth lens element and a fifth lens element, the first lens element to the fifth lens element each having an object-side surface facing toward the object side as well as an image-side surface facing toward the image side, wherein:

the first lens element has positive refractive power and the first lens element is glued to the second lens element without an air gap;

the third lens element has negative refractive power and the object-side surface of the third lens element has a concave portion in a vicinity of a periphery of the third lens element; and the fifth lens element has positive refractive power;

wherein, lens elements having refractive power included by the optical imaging lens set are only five lens elements described above.

2. The optical imaging lens set of claim 1, satisfying $0.916 \leq (G_{34}+G_{45})/T_3 \leq 4.977$, wherein an air gap $G_{34}$ is between the third lens element and the fourth lens element along the optical axis, an air gap $G_{45}$ is between the fourth lens element and the fifth lens element along the optical axis and the third lens element has a third lens element thickness $T_3$ along the optical axis.

3. The optical imaging lens set of claim 1, satisfying $0.983 \leq AAG/(T_2+G_{23}) \leq 1.982$, wherein AAG is a sum of all air gaps between each lens elements from the first lens element to the fifth lens element along the optical axis, the second lens element has a second lens element thickness $T_2$ along the optical axis and an air gap $G_{23}$ is between the second lens element and the third lens element along the optical axis.

4. The optical imaging lens set of claim 1, satisfying $1.820 \leq (T_1+T_2+T_3)/T_5 \leq 3.278$, wherein the first lens element has a first lens element thickness $T_1$ along the optical axis, the second lens element has a second lens element thickness $T_2$ along the optical axis, the third lens element has a third lens element thickness $T_3$ along the optical axis and the fifth lens element has a fifth lens element thickness $T_5$ along the optical axis.

5. The optical imaging lens set of claim 1, satisfying $1.183 \leq (G_{23}+G_{45})/T_1 < 5.796$, wherein an air gap $G_{23}$ is between the second lens element and the third lens element along the optical axis, an air gap $G_{45}$ is between the fourth lens element and the fifth lens element along the optical axis and the first lens element has a first lens element thickness $T_1$ along the optical axis.

6. The optical imaging lens set of claim 1, satisfying $1.865 \leq ALT/BFL \leq 8.859$, wherein ALT is a total thicknesses of all five lens elements along the optical axis and BFL is a distance between the image-side surface of the fifth lens element and an image plane along the optical axis.

7. The optical imaging lens set of claim 1, satisfying $1.932 \leq EFL/(G_{23}+G_{45}) \leq 6.093$, wherein EFL is an effective focal length of the optical imaging lens set, an air gap $G_{23}$ is between the second lens element and the third lens element along the optical axis and an air gap $G_{45}$ is between the fourth lens element and the fifth lens element along the optical axis.

8. The optical imaging lens set of claim 1, satisfying $4.399 \leq TTL/(T_4+T_5) \leq 8.112$, wherein TTL is a distance from the object-side surface of the first lens element to an image plane along the optical axis, the fourth lens element has a fourth lens element thickness $T_4$ along the optical axis and the fifth lens element has a fifth lens element thickness $T_5$ along the optical axis.

9. The optical imaging lens set of claim 1, satisfying $2.794 \leq (G_{23}+T_3)/T_4 \leq 15.252$, wherein the third lens element has a third lens element thickness $T_3$ along the optical axis, the fourth lens element has a fourth lens element thickness $T_4$ along the optical axis and an air gap $G_{23}$ is between the second lens element and the third lens element along the optical axis.

10. The optical imaging lens set of claim 1, satisfying $1.899 \leq EFL/AAG \leq 3.530$, wherein EFL is an effective focal length of the optical imaging lens set and AAG is a sum of all air gaps between each lens elements from the first lens element to the fifth lens element along the optical axis.

11. The optical imaging lens set of claim 1, satisfying $1.261 \leq (T_2+G_{23})/T_1 \leq 4.474$, wherein the first lens element has a first lens element thickness $T_1$ along the optical axis, the second lens element has a second lens element thickness $T_2$ along the optical axis and an air gap $G_{23}$ is between the second lens element and the third lens element along the optical axis.

12. The optical imaging lens set of claim 1, satisfying $4.154 \leq EFL/(T_1+T_3) \leq 7.552$, wherein EFL is an effective focal length of the optical imaging lens set, the first lens element has a first lens element thickness $T_1$ along the optical axis and the third lens element has a third lens element thickness $T_3$ along the optical axis.

13. The optical imaging lens set of claim 1, satisfying $2.547 \leq AAG/T_5 \leq 6.523$, wherein AAG is a sum of all air gaps between each lens elements from the first lens element to the fifth lens element along the optical axis and the fifth lens element has a fifth lens element thickness $T_5$ along the optical axis.

14. The optical imaging lens set of claim 1, satisfying $0.439 \leq (T_3+T_4+T_5)/G_{23} \leq 1.561$, wherein the third lens element has a third lens element thickness $T_3$ along the optical axis, the fourth lens element has a fourth lens element thickness $T_4$ along the optical axis, the fifth lens element has a fifth lens element thickness $T_5$ along the optical axis and an air gap $G_{23}$ is between the second lens element and the third lens element along the optical axis.

15. The optical imaging lens set of claim 1, satisfying $0.417 \leq BFL/T_5 \leq 2.893$, wherein BFL is a distance between the image-side surface of the fifth lens element and an image plane along the optical axis and the fifth lens element has a fifth lens element thickness $T_5$ along the optical axis.

16. The optical imaging lens set of claim 1, satisfying $1.010 \leq G_{23}/T_1 \leq 3.802$, wherein the first lens element has a first lens element thickness $T_1$ along the optical axis and an air gap $G_{23}$ is between the second lens element and the third lens element along the optical axis.

17. The optical imaging lens set of claim 1, satisfying $0.747 \leq ALT/(T_2+G_{23}) \leq 2.241$, wherein ALT is a total thicknesses of all five lens elements along the optical axis, the second lens element has a second lens element thickness $T_2$ along the optical axis and an air gap $G_{23}$ is between the second lens element and the third lens element along the optical axis.

18. The optical imaging lens set of claim 1, satisfying $2.945 \leq EFL/G_{max} \leq 5.794$, wherein EFL is an effective focal length of the optical imaging lens set and $G_{max}$ is a max value of air gaps from the first lens element to the fifth lens element along the optical axis.

19. The optical imaging lens set of claim 1, satisfying $1.990 \leq (T_1+G_{34})/T_4 \leq 4.925$, wherein the first lens element has a first lens element thickness $T_1$ along the optical axis, the fourth lens element has a fourth lens element thickness $T_4$ along the optical axis and an air gap $G_{34}$ is between the third lens element and the fourth lens element along the optical axis.

20. The optical imaging lens set of claim 1, satisfying $2.330 \leq TTL/(G_{23}+T_4) \leq 4.481$, wherein TTL is a distance from the object-side surface of the first lens element to an image plane along the optical axis, an air gap $G_{23}$ is between the second lens element and the third lens element along the optical axis and the fourth lens element has a fourth lens element thickness $T_4$ along the optical axis.

* * * * *